US008783753B2

(12) United States Patent
Ito et al.

(10) Patent No.: US 8,783,753 B2
(45) Date of Patent: Jul. 22, 2014

(54) STOWABLE REAR SEAT

(75) Inventors: Teppei Ito, Shioya-gun (JP); Kazuyuki Kaneko, Wako (JP)

(73) Assignees: TS Tech Co., Ltd., Asaki-Shi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/978,619

(22) PCT Filed: Dec. 28, 2011

(86) PCT No.: PCT/JP2011/080406
§ 371 (c)(1),
(2), (4) Date: Jul. 8, 2013

(87) PCT Pub. No.: WO2012/093635
PCT Pub. Date: Jul. 12, 2012

(65) Prior Publication Data
US 2013/0278005 A1 Oct. 24, 2013

(30) Foreign Application Priority Data

Jan. 7, 2011 (JP) ................................. 2011-002359
Jan. 7, 2011 (JP) ................................. 2011-002388

(51) Int. Cl.
*B60N 2/30* (2006.01)
(52) U.S. Cl.
USPC ...................................................... 296/65.09
(58) Field of Classification Search
CPC ..... B60N 2/3011; B60N 2/305; B60N 2/0155
USPC ............... 296/65.05, 65.08, 65.09, 66, 65.14; 297/326, 316, 15
See application file for complete search history.

(56) References Cited

U.S. PATENT DOCUMENTS

| | | | | |
|---|---|---|---|---|
| 5,730,480 A | * | 3/1998 | Takamura | 248/503.1 |
| 6,290,297 B1 | * | 9/2001 | Yu | 297/378.12 |
| 6,568,756 B2 | * | 5/2003 | Sugimoto et al. | 297/335 |
| 6,676,198 B2 | * | 1/2004 | Demptos et al. | 296/187.03 |
| 2004/0104590 A1 | | 6/2004 | Kikuchi et al. | |
| 2009/0152888 A1 | * | 6/2009 | Zelmanov et al. | 296/65.09 |
| 2011/0049925 A1 | * | 3/2011 | Champ | 296/65.09 |

FOREIGN PATENT DOCUMENTS

| | | |
|---|---|---|
| JP | A-9-30303 | 2/1997 |
| JP | A-2001-63419 | 3/2001 |
| JP | A-2002-19505 | 1/2002 |
| JP | A-2003-182420 | 7/2003 |
| JP | A-2004-82823 | 3/2004 |

OTHER PUBLICATIONS

Apr. 3, 2012 International Search Report issued in International Patent Application No. PCT/JP2011/080406.

* cited by examiner

*Primary Examiner* — Pinel Romain
(74) *Attorney, Agent, or Firm* — Oliff PLC

(57) ABSTRACT

A stowable rear seat, wherein a seat back section comprises: a seat back body stood in a floor surface so as to tilt freely; a seat back locking mechanism that locks the tilting of the seat back body; and a swinging member that swings in the forward/backward direction in conjunction with the tilting movement of the seat back body when the lock of the seat back locking mechanism is released and the seat back body tilts. The seat cushion section of the stowable rear seat comprises: a seat cushion body freely housed in the underfoot floor surface and arranged horizontally in the floor surface in front of the seat back body, and a seat cushion locking mechanism that locks the seat cushion body in a horizontal state on the floor surface.

20 Claims, 23 Drawing Sheets

FIG.6
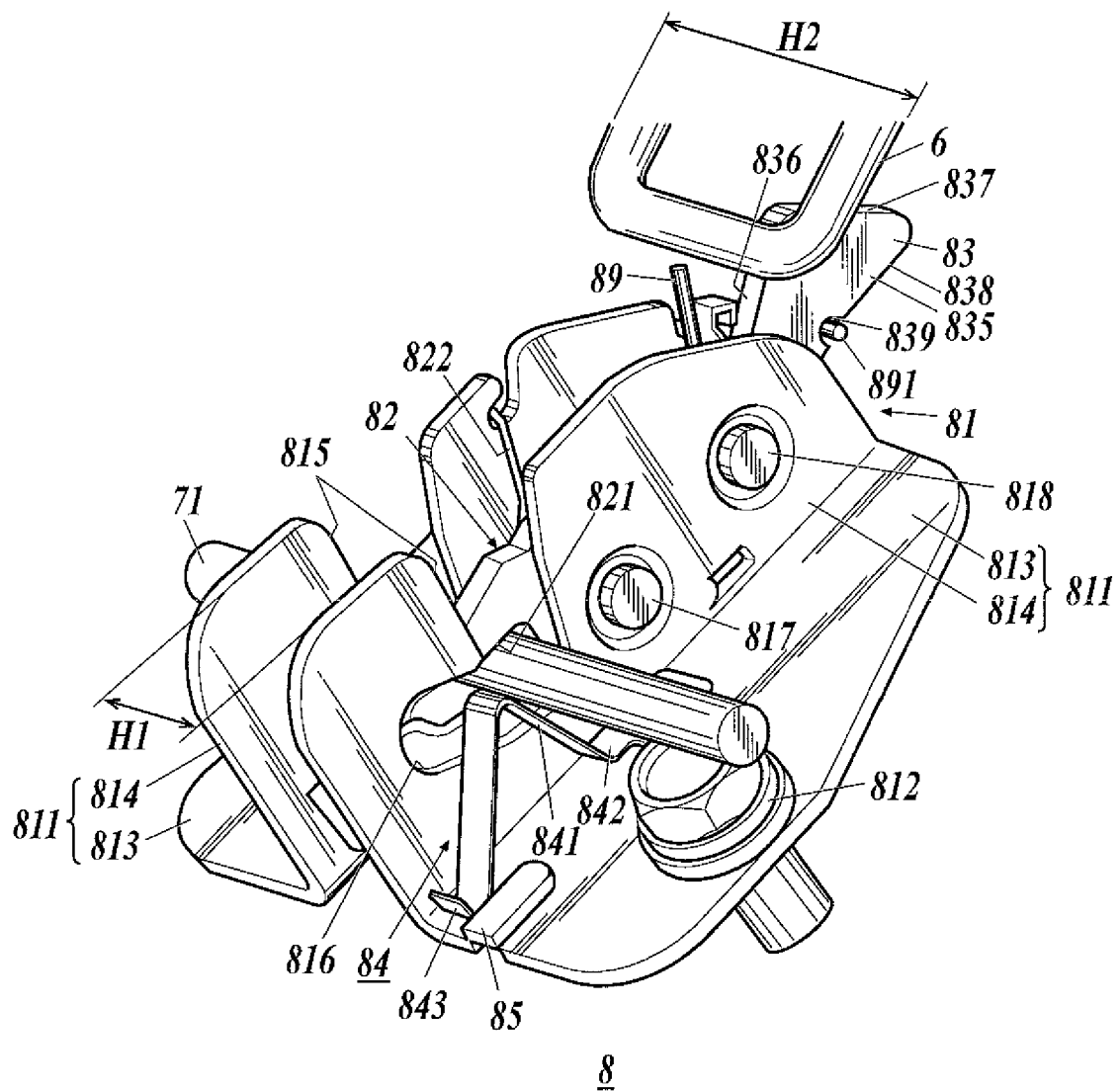
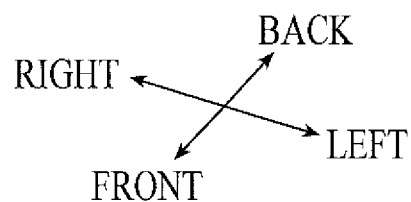

FIG. 7
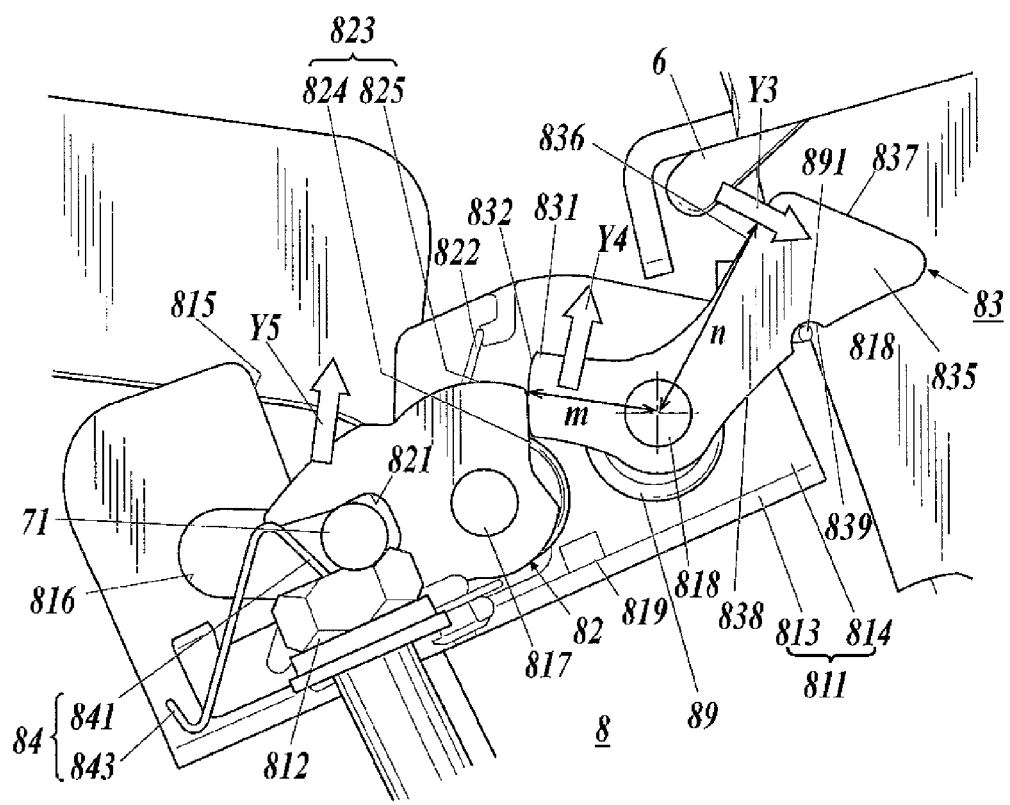
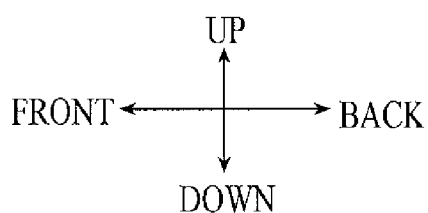

FIG.11
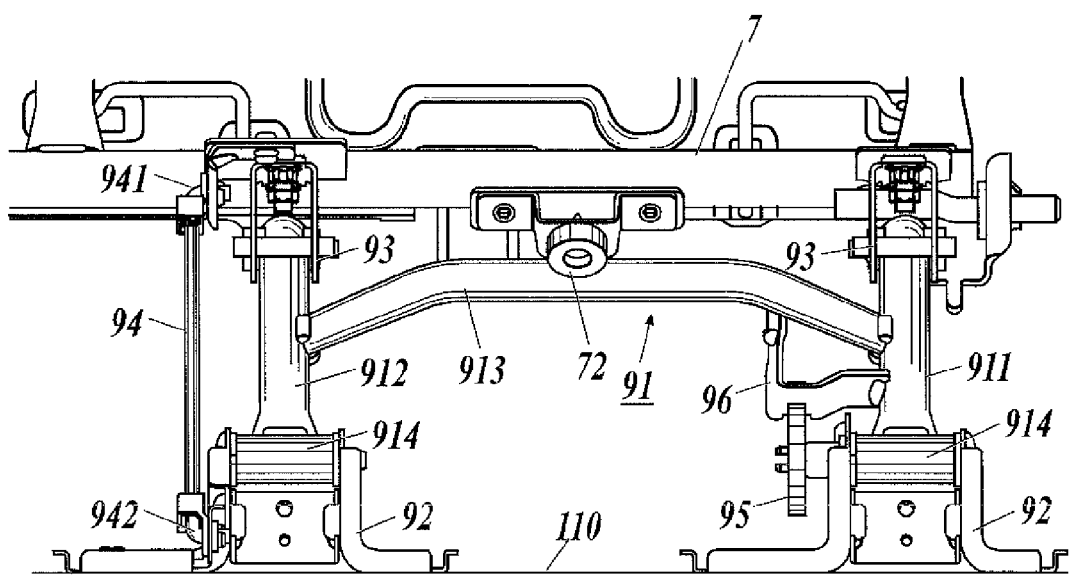
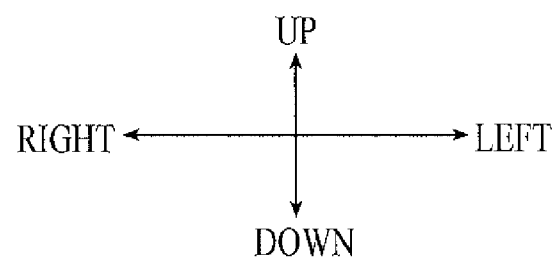

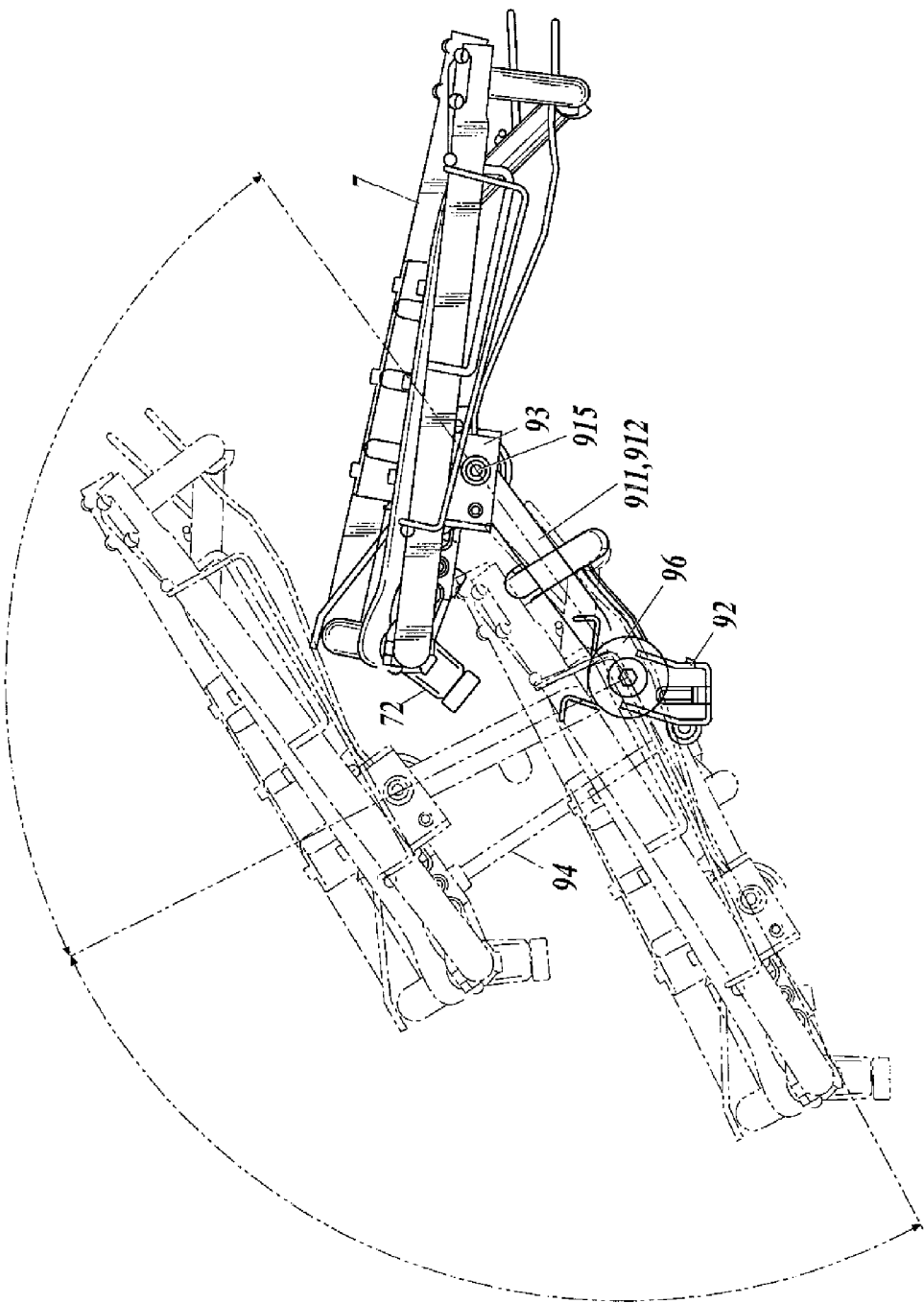

FIG.19
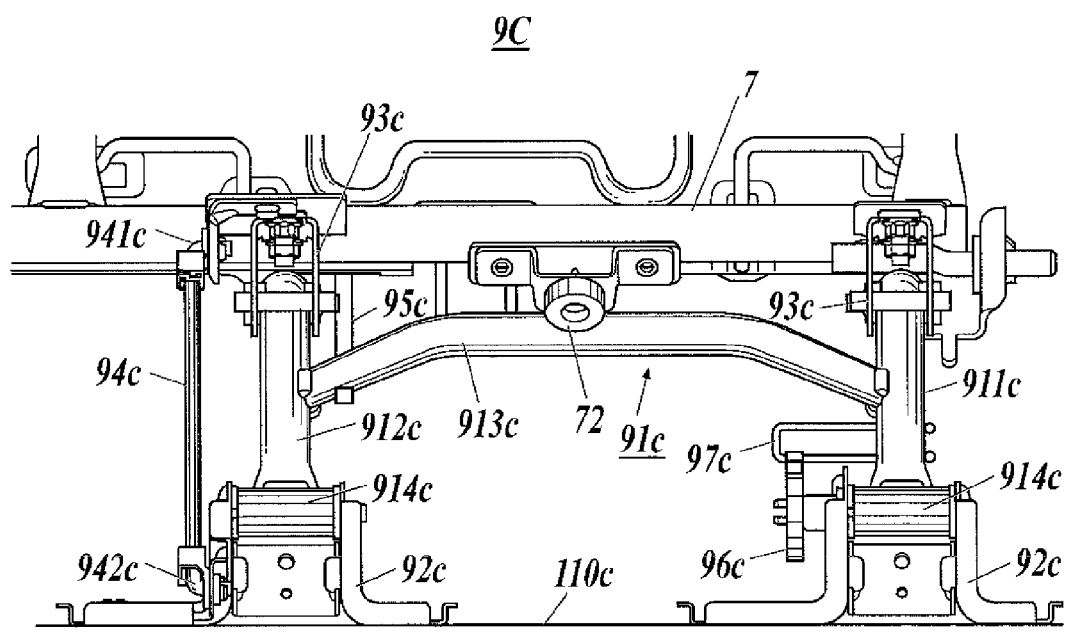
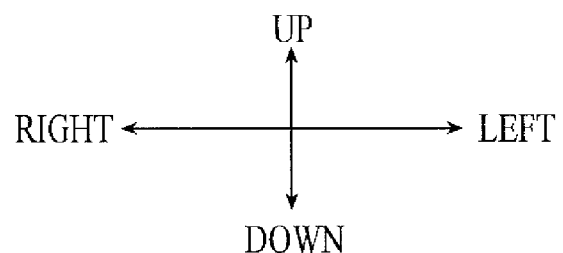

STOWABLE REAR SEAT

TECHNICAL FIELD

The present invention relates to a stowable rear seat.

BACKGROUND ART

Some conventional vehicles include stowable rear seats so as to extend the space of rear passenger rooms in the case of no passengers in the rear passenger spaces (for example, refer to Patent Document 1). The stowable rear seat includes a seat cushion and a seat back. In a seatable state, the seat cushion is placed in a substantially horizontal posture relative to a floor surface while the seat back is positioned in an upright state at the rear of the seat cushion. In a stowed state, the seat cushion is placed on a foot floor surface at a lower position than the floor surface in a substantially horizontal posture while the seat back is folded in a substantially horizontal posture relative to the floor surface. In order to change the seatable state to the stowed state, a user releases the locks for the seat cushion and for the seat back and then moves the seat cushion to the foot floor surface and then tilts the seat back.

PRIOR ART DOCUMENT

Patent Document

Patent Document 1: Japanese Unexamined Patent Application Publication No. H9-30303

SUMMARY OF INVENTION

Problems to be Solved by the Invention

In recent years, simplified stowing operations have been awaited in order to improve the usability.

Accordingly, it is an object of the present invention to provide a simplified stowing operation for the stowable rear seat.

Means for Solving the Problem

On order to solve the above problems, the invention described in claim 1 is a stowable rear seat, including:
a seat back unit; and
a seat cushion unit, wherein
the seat back unit including:
  a tiltable seat back body erecting on a floor surface;
  a seat back locking mechanism for locking a tilt of the seat back body; and
  a rocking member provided at a lower end of the seat back body which rocks in an anteroposterior direction in cooperation with a tilting operation of the seat back body after locking of the seat back locking mechanism is unlocked;
the seat cushion unit including:
  a seat cushion body horizontally placed on the floor surface in front of the seat back body, the seat cushion body being foldable on a foot floor surface at a lower position than the floor surface; and
  a seat cushion locking mechanism provided in the floor surface, the seat cushion locking mechanism engaging with a back end of the seat cushion body to lock a horizontal state of the seat cushion body on the floor surface, and
the rocking member is detached from the seat cushion locking mechanism when the seat back body is in an upright state, and is in contact with the seat cushion locking mechanism when the seat back body is in a tilted state to release the lock of the seat cushion locking mechanism.

The invention described in claim 2 is the stowable rear seat according to claim 1, wherein
the seat cushion unit includes:
  a shifting mechanism which shifts the seat cushion body between the horizontal state on the floor surface and a folded state on the foot floor surface, and
the shifting mechanism shifts the seat cushion body from the horizontal state on the floor surface to the folded state on the foot floor surface when the seat cushion locking mechanism is unlocked.

The invention described in claim 2 is the stowable rear seat according to claim 1, further including:
a lock shaft provided at the back end of the seat cushion body, the lock shaft engaging with the seat cushion locking mechanism to lock the horizontal state of the seat cushion body on the floor surface, wherein
the seat cushion locking mechanism comprises:
  a base plate having a cutout which is extended vertically and an upper part thereof opened such that the lock shaft is capable of moving forward and backward;
  a regulation pawl rotatably attached to the base plate, the regulation pawl being rotated urged by the lock shaft entering the cutout, occluding an upside of the lock shaft after entry of the lock shaft up to a lower end of the cutout to regulate upward movement of the lock shaft and maintaining the horizontal state of the seat cushion body; and
  a ratchet unit rotatably attached to the base plate and engaging with the regulation pawl to thereby lock/release the regulated state of the regulation pawl, wherein
the ratchet unit has one end engaging with the regulation pawl and the other end placed on a rocking path of the rocking member, the other end rotating the ratchet unit urged by the rocking member and releasing the regulated state of the regulation pawl;
the one end of the ratchet unit engages with the regulation pawl;
the ratchet unit is urged in a locking direction of the regulation pawl; and
the other end of the ratchet unit is configured to rotate the ratchet unit in a direction opposite to the urging direction so as to retract the ratchet unit from the rocking path when the rocking member urges one of a first urging surface placed on the rocking path of the rocking member and urged by the rocking member when the seat back body is tilted from the upright state and a second urging surface urged by the rocking member when the seat back body erects from the tilted state.

The invention described in claim 4 is the stowable rear seat according to claim 3, wherein
the one end of the ratchet unit engages with the regulation pawl by coming into contact with respective cam surfaces provided therein; and
at least one of the cam surfaces of the one end of the ratchet unit and the regulation pawl has such a shape that the ratchet unit pushes the regulation pawl toward the cutout when the regulated state of the regulation pawl is to be locked.

The invention described in claim 5 is the stowable rear seat according to claim 4, wherein
 a distance from the cam surface of the one end of the ratchet unit to a rotational shaft of the ratchet unit is shorter than a distance from a position of the rocking member contacting the first urging surface to the rotational shaft of the ratchet unit.

The invention described in claim 6 is the stowable rear seat according to claim 3, wherein
 the first urging surface is closer to a rotational shaft of the ratchet unit than the second urging surface;
 the other end of the ratchet unit has the first urging surface projecting outward from the base plate; and
 the rocking member rocks outside the base plate.

The invention described in claim 7 is the stowable rear seat according to claim 3, wherein
 the second urging surface is provided on the tip surface of the other end of the ratchet unit; and
 the other end of the ratchet unit has a larger width at a position that is further distant from a rotational shaft of the ratchet unit.

The invention described in claim 8 is the stowable rear seat according to claim 1, further including:
 a shifting mechanism for shifting the seat cushion body between the horizontal state on the floor surface and a folded state on the foot floor surface, wherein
 the shifting mechanism includes:
  a pair of parallel legs rotatably attached to the seat cushion body and the foot floor surface and supporting the seat cushion body so as to guide the seat cushion body between a horizontal state on the floor surface and a folded state on the foot floor surface; and
  a guide member rotatably attached to the seat cushion body and the foot floor surface and comprising a rod member for guiding the seat cushion body between the horizontal state on the floor surface and the folded state on the foot floor surface together with the paired legs.

The invention described in claim 9 is the stowable rear seat according to claim 8, wherein
 both ends of the rod member comprise rotational shafts.

The invention described in claim 10 is the stowable rear seat according to claim 8, wherein
 a rotational shaft of the guide member adjacent to the seat cushion body is placed further forward than rotational shafts of the paired legs adjacent to the seat cushion body; and
 a rotational shaft of the guide member adjacent to the foot floor surface is placed further forward and downward than rotational shafts of the paired legs adjacent to the foot floor surface.

The invention described in claim 11 is the stowable rear seat according to claim 8, wherein
 the guide member is placed outside the paired legs.

The invention described in claim 12 is the stowable rear seat according to claim 1, further including:
 a shifting mechanism for shifting the seat cushion body between the horizontal state on the floor surface and a folded state on the foot floor surface, wherein
 the shifting mechanism includes:
  a pair of right and left legs rotatably attached to the seat cushion body and the foot floor surface and rotating relative to the foot floor surface in the anteroposterior direction to support the seat cushion body so as to guide the seat cushion body between the horizontal state on the floor surface and the folded state on the foot floor surface; and
  a rotation urging unit for applying rotational force to at least one of the paired legs when the seat cushion body is guided from the horizontal state on the floor surface to a folded state on the foot floor surface.

The invention described in claim 13 is the stowable rear seat according to claim 12, wherein
 connection between the rotation urging unit and at least one of the legs is released before the seat cushion body reaches the folded state on the foot floor surface.

The invention described in claim 14 is the stowable rear seat according to claim 12, wherein
 the rotation urging unit is placed inside the paired legs.

The invention described in claim 15 is the stowable rear seat according to claim 12, wherein
 the rotation urging unit is placed adjacent to the foot floor surface in the leg.

The invention described in claim 16 is the stowable rear seat according to claim 1, further comprising:
 a shifting mechanism for shifting the seat cushion body between the horizontal state on the floor surface and a folded state on the foot floor surface, wherein
 the shifting mechanism comprises:
  a pair of right and left legs rotatably attached to the seat cushion body and the foot floor surface and rotating relative to the foot floor surface in the anteroposterior direction to support the seat cushion body so as to guide the seat cushion body between the horizontal state on the floor surface and the folded state on the foot floor surface; and
  a first rotation urging unit for applying rotational force to at least one of the paired legs when the seat cushion body is guided from the folded state on the foot floor surface to the horizontal state on the floor surface.

The invention described in claim 17 is the stowable rear seat according to claim 16, further comprising:
 a second rotation urging unit for applying rotational force to at least the other of the paired legs when the seat cushion body is guided from the horizontal state on the floor surface to the folded state on the foot floor surface.

The invention described in claim 18 is the stowable rear seat according to claim 17, wherein
 the first rotation urging unit is placed adjacent to the seat cushion body in the leg; and
 the second rotation urging unit is placed adjacent to the foot floor surface in the leg.

The invention described in claim 19 is the stowable rear seat according to claim 17, wherein
 the first and second rotation urging units are placed inside the paired legs.

The invention described in claim 20 is the stowable rear seat according to any one of claims 17 to 19, wherein
 connection between the first rotation urging unit and at least one of the legs is released before the seat cushion body reaches the horizontal state on the floor surface; and
 connection between the second rotation urging unit and at least the other of the legs is released before the seat cushion body reaches the folded state on the foot floor surface.

Effects of Invention

According the invention described in claim 1, the seat cushion locking mechanism is unlocked when the rocking member rocks in cooperation with the tilting of the seat back body from the upright state. As a result, the seat cushion locking mechanism is unlocked in cooperation with the tilting operation of the seat back body. This can eliminate a manual unlocking operation for the seat cushion locking mechanism and simplify the stowing operation compared to manual unlocking for each of the seat back unit and the seat cushion unit.

The rocking member is detached from the seat cushion locking mechanism in the upright state of the seat back body and comes into contact with the seat cushion locking mechanism to unlock the seat cushion locking mechanism in the tilted state of the seat back body. This can provide an allowance required for the unlocking operation. The unlocking can thereby be prevented even if the seat back body tilts slightly by, for example, the vibration of the vehicles.

Additionally, the rocking member is detached from the seat cushion locking mechanism in the upright state of the seat back body to prevent abnormal noise caused by the contact between these two components.

According to the invention described in claim 2, if the seat cushion locking mechanism is unlocked, the shifting mechanism shifts the seat cushion body from the horizontal state on the floor surface to the folded state on the foot floor surface. This also allows a folding operation for the seat cushion body in cooperation with the tilt of the seat back body. The stowing operation can thereby be further simplified.

According to the invention described in claim 3, the rocking member urges one of the first and second urging surfaces to rotate the ratchet unit in a direction opposite to the urged direction to retract the ratchet unit from the rocking path, the first urging surface being urged by the rocking member when the seat back body is tilted from the upright state, the second urging surface being urged by the rocking member when the seat back body erects from the tilted state. As a result, the ratchet unit can be retracted from the rocking path when the seat back body is tilted from the upright state or when it erects from the tilted state. In other words, even if the rocking member contacts the other end of the ratchet unit on the rocking path during the erection of the seat back body from the tilted state, the ratchet unit can be smoothly retracted from the rocking path and enables a smooth erection operation. That is, the stowable rear seat can smoothly be returned to the upright state even before the seat back body is folded completely.

According to the invention described in claim 4, at least one of the cam surface of the regulation pawl and the cam surface of the end of the ratchet unit has such a shape that the ratchet unit pushes the regulation pawl toward the cutout to lock the regulated state of the regulation pawl; hence, the lock shaft can be firmly held by the regulation pawl pushed toward the cutout during the locking.

According to the invention described in claim 5, the distance from the cam surface of the end of the ratchet unit to the rotational shaft of the ratchet unit is shorter than the distance from a position of the rocking member contacting the first urging surface to the rotational shaft; hence, the principle of leverage can be applied to reduce the urging force from the rocking member required for the operation of the ratchet unit. This configuration can release the lock by the seat cushion locking mechanism with small force.

According to the invention described in claim 6, the first urging surface urged by the rocking member rocking outside the base plate can project outward from the base plate to prevent the interference of the rocking member with the base plate. A configuration including the rocking member coming into contact with the first urging surface inside the base plate requires such a large base plate as to allow entry of the rocking member. In contrast, a rocking member coming into contact with the first urging surface outside the base plate can avoid an increase in the size of the base plate with no need to consider the entering of the rocking member.

According to the invention described in claim 7, the other end of the ratchet unit has a larger width at a position that is further distant from the second rotational shaft. This configuration can increase the area of the second urging surface provided on the tip surface of the other end. The surface for guiding the rocking member thereby increases when the rocking member urges the second urging surface during shifting from the tilted state to the upright state. This can stabilize the operation of the ratchet unit.

According to the invention described in claim 8, the guide member guides the seat cushion body between the horizontal state on the floor surface and the folded state on the foot floor surface together with the paired legs. This can prevent the rattle of the seat cushion body in the folding operation. As a result, the seat cushion body can be smoothly folded to reduce the manual adjustment.

According to the invention described in claim 9, both ends of the rod member composed of the guide member function as the rotational shafts; hence, the guide member can be integrated with the rotational shafts to enhance the stability of the operation. This can also reduce the number of parts and improve the assembling work efficiency.

According to the invention described in claim 10, the rotational shaft of the guide member adjacent to the seat cushion body is placed further forward than the rotational shafts of the paired legs adjacent to the seat cushion body while the rotational shaft of the guide member adjacent to the foot floor surface is placed further forward and downward than the rotational shafts of the paired legs and adjacent to the foot floor surface. This geometry enables the seat cushion body to be smoothly disposed at a substantially horizontal posture during the folded state on the foot floor surface.

According to the invention described in claim 11, the guide member is provided outside the paired legs; hence, the paired legs do not interfere with the guide member to secure a smooth operation.

According to the invention described in claim 12, the rotation urging unit applies rotational force to at least one of the legs in order to guide the seat cushion body from the horizontal state on the floor surface to the folded state on the foot floor surface. The rotational force can automatically move the seat cushion body to the folded state on the foot floor surface. This configuration can provide a smooth folding operation of the seat cushion unit.

According to the invention described in claim 13, the connection between the rotation urging unit and at least one of the legs is released before the seat cushion body reaches the folded state on the foot floor surface. This configuration can intercept the transmission of the biasing force halfway through the folding operation of the seat cushion body to shift the seat cushion body to the folded state on the foot floor surface by the remaining force. As a result, shock can be eased during the contact of the seat cushion body with the foot floor surface.

According to the invention described in claim 14, the rotation urging unit is placed inside the paired legs and can therefore be protected by the legs. This configuration can stabilize the operation over a long period of time.

According to the invention described in claim 15, the rotation urging unit can be placed adjacent to the foot floor surface in the legs to therefore connect the rotation urging unit to a portion having high rigidity in the legs. This configuration can stabilize the operation of the rotation urging unit.

According to the invention described in claim 16, the first rotation urging unit applies rotational force to at least one of the legs in order to guide the seat cushion body from the folded state on the foot floor surface to the horizontal state on the floor surface. As a result, the rotational force of the first rotation urging unit can serve as auxiliary force to raise the seat cushion body with smaller force when the seat cushion body folded on the foot floor surface is returned to the floor surface. This configuration allows the seat cushion body to be returned more easily.

According to the invention described in claim 17, the second rotation urging unit applies rotational force to at least the other leg in order to guide the seat cushion body from the horizontal state on the floor surface to the folded state on the foot floor surface. The rotational force can automatically move the seat cushion body to the folded state on the foot floor surface. This configuration can provide a smooth folding operation of the seat cushion unit.

According to the invention described in claim 18, the first rotation urging unit is placed adjacent to the seat cushion body in the leg while the second rotation urging unit is placed adjacent to the foot floor surface in the leg. This configuration can prevent interference between both the units to stabilize the operation.

According to the invention described in claim 19, the first and second rotation urging units are placed inside the paired legs and can therefore be protected by the legs. This configuration can stabilize the operation over a long period of time.

According to the invention described in claim 20, the connection between the first rotation urging unit and at least one of the legs is released before the seat cushion body reaches the horizontal state on the floor surface. As a result, the seat cushion body starts to move from the horizontal state, while the rotational force of the second rotation urging unit is applied without application of the rotational force of the first rotation urging unit. This configuration can achieve quick start-up of the folding operation.

Additionally, the connection between the second rotation urging unit and at least the other leg is released before the seat cushion body reaches the folded state on the foot floor surface. This configuration can intercept the transmission of the biasing force halfway through the folding operation of the seat cushion body to shift the seat cushion body to the folded state on the foot floor surface by the remaining force. As a result, shock can be eased during the contact of the seat cushion body with the foot floor surface.

BRIEF DESCRIPTION OF DRAWINGS

FIG. 6 This is a perspective view illustrating an outline configuration of a seat cushion locking mechanism according to the present embodiment.

FIG. 7 This is a side view illustrating an outline configuration of the seat cushion locking mechanism according to the present embodiment.

FIG. 11 This is a front view illustrating an outline configuration of a shifting mechanism in a horizontal state of the seat cushion body according to the present embodiment.

FIG. 15 This is a schematic side view illustrating the operation of the shifting mechanism according to the present embodiment.

FIG. 19 This is a front view illustrating a modification of the shifting mechanism.

DESCRIPTION OF EMBODIMENTS

Exemplary embodiments according to the present invention will now be described with reference to the accompanying drawings. Although various preferred technical limitations are applied to the following embodiments according to the present invention, the scope of the present invention should not be limited to these embodiments and examples illustrated in these drawings.

Figure 1:
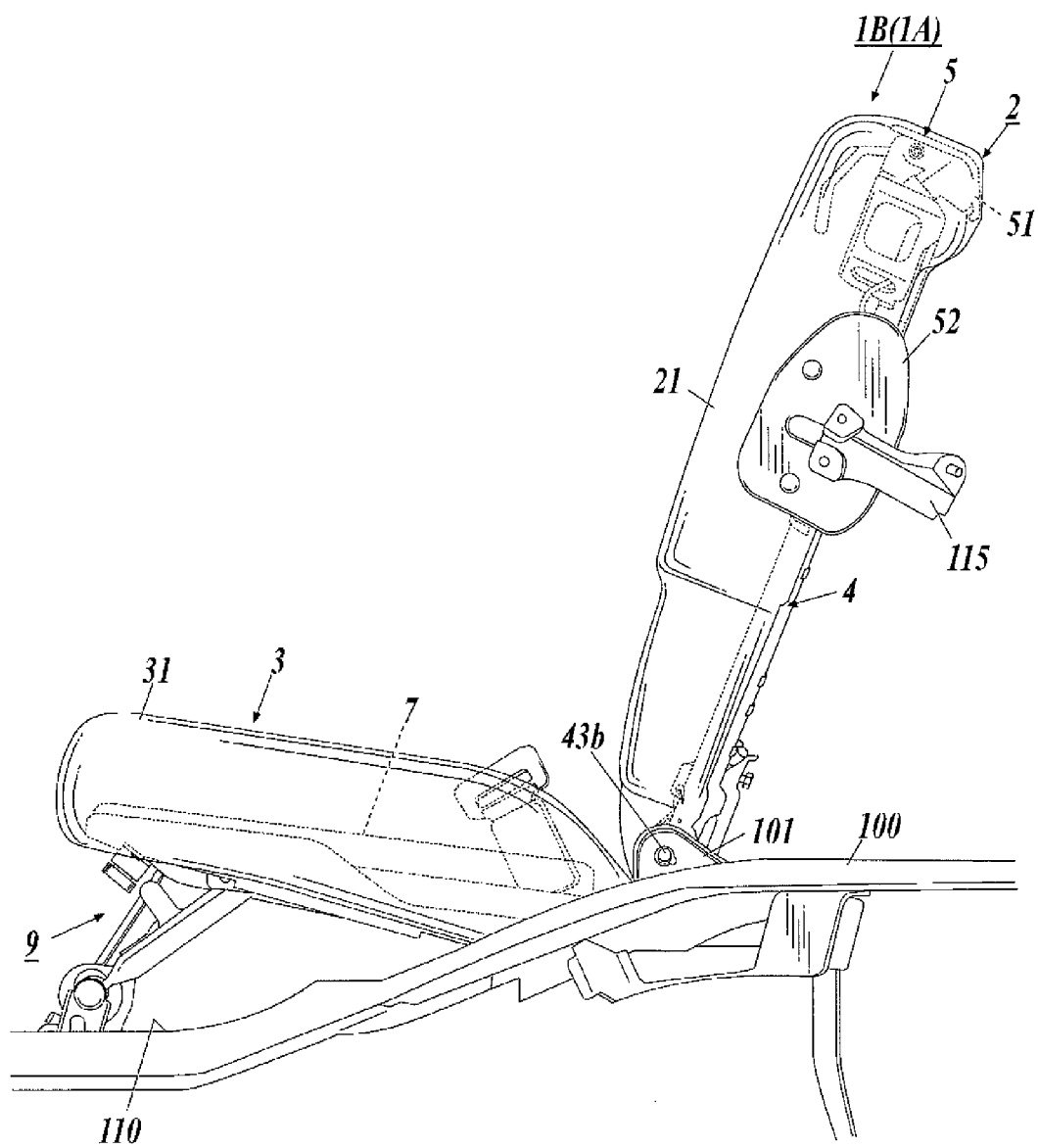
FIG. 1 This is a side view illustrating an outline configuration of a stowable rear seat according to the present embodiment.
Figure 2:
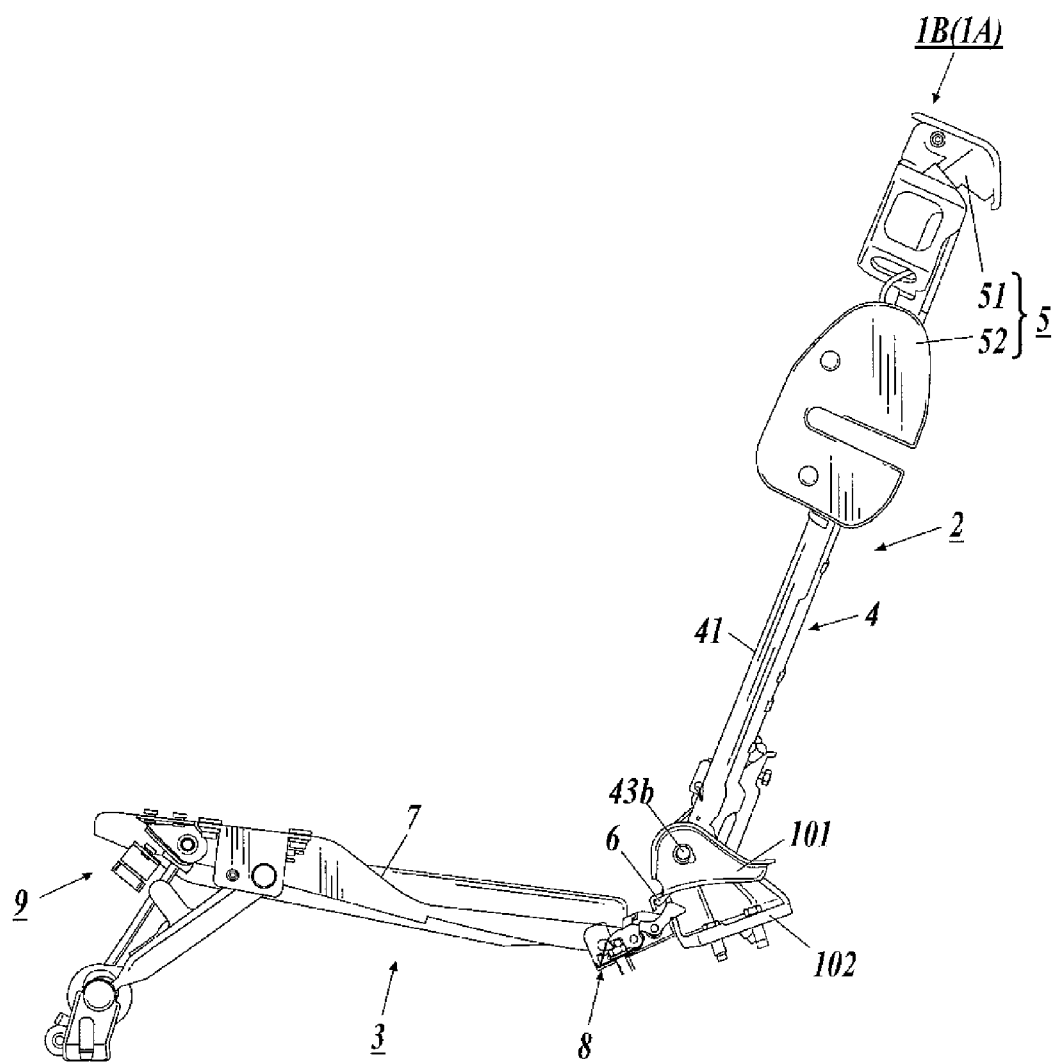
FIG. 2 This is a side view illustrating an internal configuration of the stowable rear seat in FIG. 1.
Figure 3:
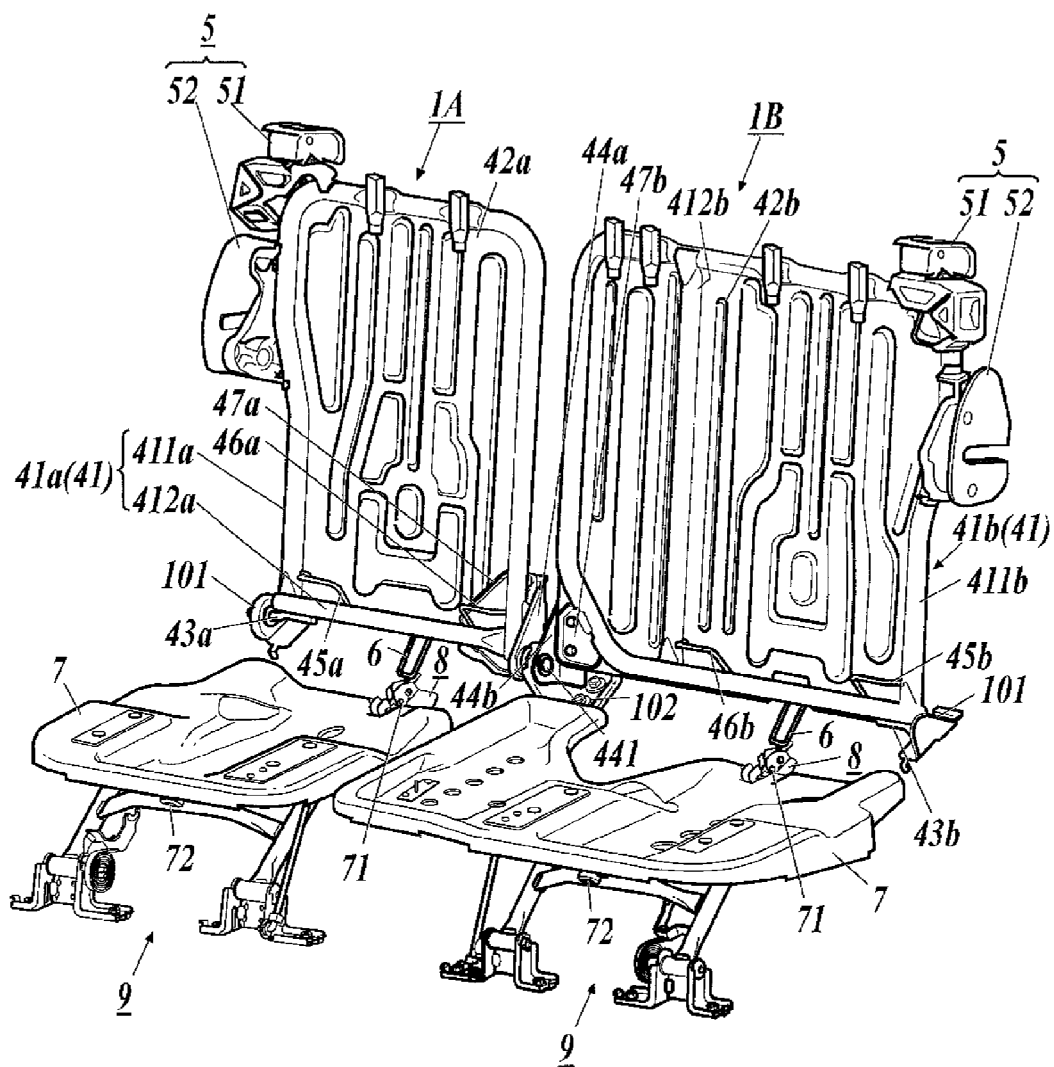
FIG. 3 This is a perspective view illustrating the internal configuration of the stowable rear seat in FIG. 1.

FIG. 1 is a side view illustrating an outline configuration of a stowable rear seat according to the present embodiment. FIG. 2 is a side view illustrating an internal configuration of the stowable rear seat. FIG. 3 is a perspective view illustrating the internal configuration of the stowable rear seat. As illustrated in FIG. 3, a pair of right and left stowable rear seats 1A and 1B is provided so as to be stowable independently. The right stowable rear seat 1A has a smaller width than that of the left stowable rear seat 1B.

As illustrated in FIG. 1, the stowable rear seats 1A and 1B each include a seat back unit 2 and a seat cushion unit 3, which are covered with the seat pads 21 and 31, respectively.

The seat back unit 2 will now be described. The seat back unit 2 includes a tiltable seat back body 4 erecting on a floor surface 100 of a vehicle body and a seat back locking mechanism 5 which locks the tilt of the seat back body 4.

As illustrated in FIGS. 2 and 3, the seat back body 4 includes a seat back frame 41 functioning as the outer periphery of the seat back body 4, a back board 42 attached to the seat back frame 41, and hinge units 43 and 44 provided at the right and left lower ends of the seat back frames 41. The hinge units are rotatably supported by the floor surface 100 such that the seat back frame 41 can be tilted.

The seat back frame 41 of the right stowable rear seat 1A has a different configuration from that of the left stowable rear seat 1B. The seat back frame 41a of the right stowable rear seat 1A will now be described.

As illustrated in FIG. 3, the right seat back frame 41a includes a first pipe unit 411a formed by bending one pipe so as to surround the upper, right, and left sides of the back board 42a, and a second pipe unit 412a having a linear shape placed on the lower side of the back board 42a so as to be connected to both ends of the first pipe unit 411a. As a result, the entire seat back frame 41a surrounds the outer periphery of the back board 42a.

Inside the right and left corners between the first and second pipe units 411a and 412a, wires 45a and 46a for mounting a child safety seat (not illustrated) are provided.

Among the hinge units 43a and 44a, the hinge unit 43a adjacent to the outside of the vehicle is a rotatable hinge shaft engaging with a support bracket 101 provided on the floor surface 100, and is welded to the second pipe unit 412a.

The other hinge unit 44a adjacent to the center of the vehicle is a rotatable hinge bracket engaging via a hinge shaft 441 with a center hinge bracket 102 provided on the floor surface 100. The hinge unit 44a is attached to the left lower corner of the back board 42a. In the left lower corner of the back board 42a, a reinforcing member 47a is provided so as to surround the hinge unit 44a and the wire 46a.

Figure 4:
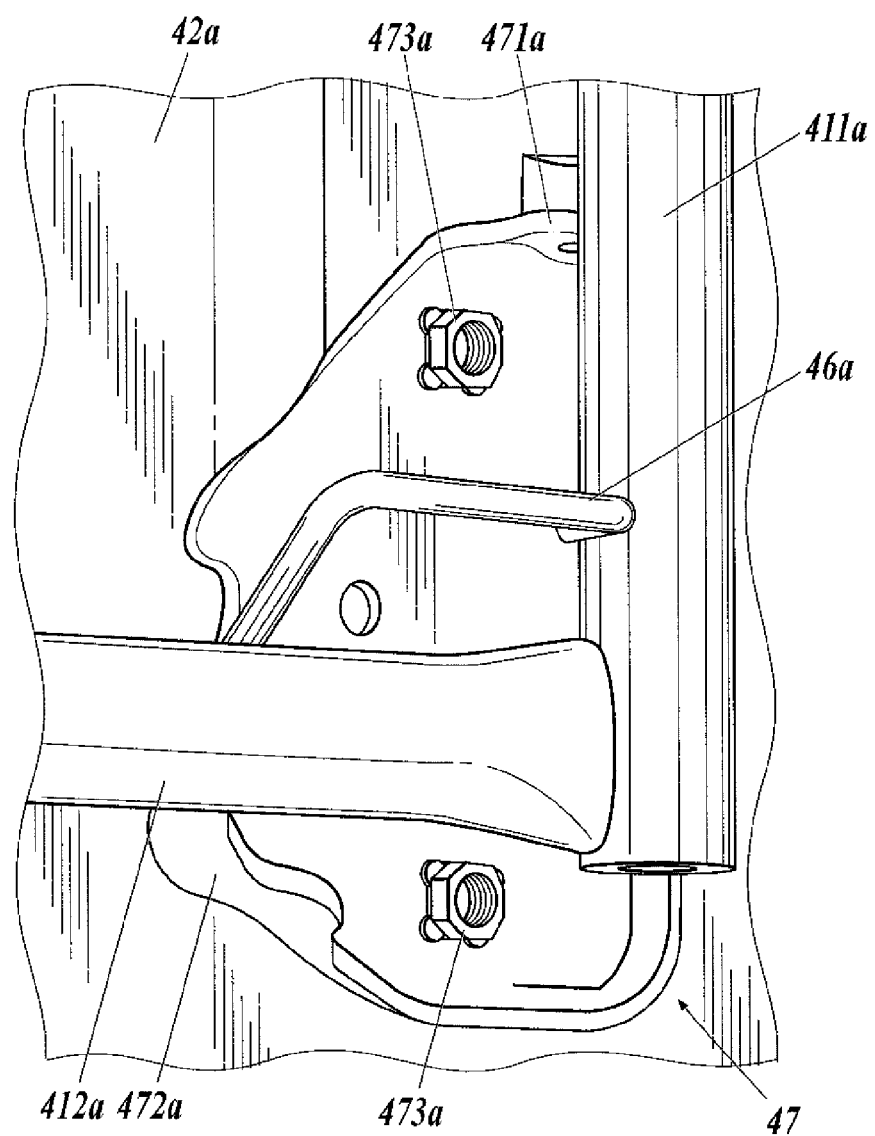
FIG. 4 This is a perspective view illustrating an outline configuration of a reinforcing member according to the present embodiment.

FIG. 4 is a perspective view illustrating an outline configuration of the reinforcing member 47a.

The reinforcing member 47a has a larger thickness than that of the back board 42a and is welded to the first and second pipe units 411a and 412a. The reinforcing member 47a has welded portions 471a and 472a having ribs in order to assure high welding strength. Screw units 473a for fixing the hinge 44a are provided in the upper and lower portions of the reinforcing member 47a. The hinge 44a is fixed to the back board 42a via the reinforcing member 47a to enhance the attachment strength of the hinge 44a.

The seat back frame 41b of the left stowable rear seat 1B will now be described.

As illustrated in FIG. 3, the left seat back frame 41b includes a pipe unit 411b formed by bending a single pipe so as to surround the entire periphery of the back board 42b. The pipe unit 411b is bent so as to chamfer its right lower corner and surround the back board 42b except for its right lower corner. Both ends of the pipe unit 411b are welded at the left lower corner of the back board 42b. Inside the pipe unit 411b, a reinforcing pipe 412b bridges between the upper and lower sides of the pipe unit 411b.

In the left corner between the reinforcing pipe 412b and the lower side of the pipe unit 411b and in the corner between the left and lower sides of the pipe unit 411b, wires 45b and 46b are provided for mounting a child safety seat (not illustrated).

Among hinge units 43b and 44b, the hinge unit 43b adjacent to the outside of the vehicle is a rotatable hinge shaft engaging with a support bracket 101 provided on the floor surface 100, and is welded to the left lower corner of the pipe unit 411b.

The other hinge unit 44b adjacent to the center of the vehicle is a rotatable hinge bracket engaging via a hinge shaft 441 with a center hinge bracket 102 provided on the floor surface 100. The hinge unit 44b is attached to the right lower corner of the back board 42b. In the left lower corner of the back board 42b, a reinforcing member 47b is provided so as to surround the hinge unit 44b.

Figure 5:
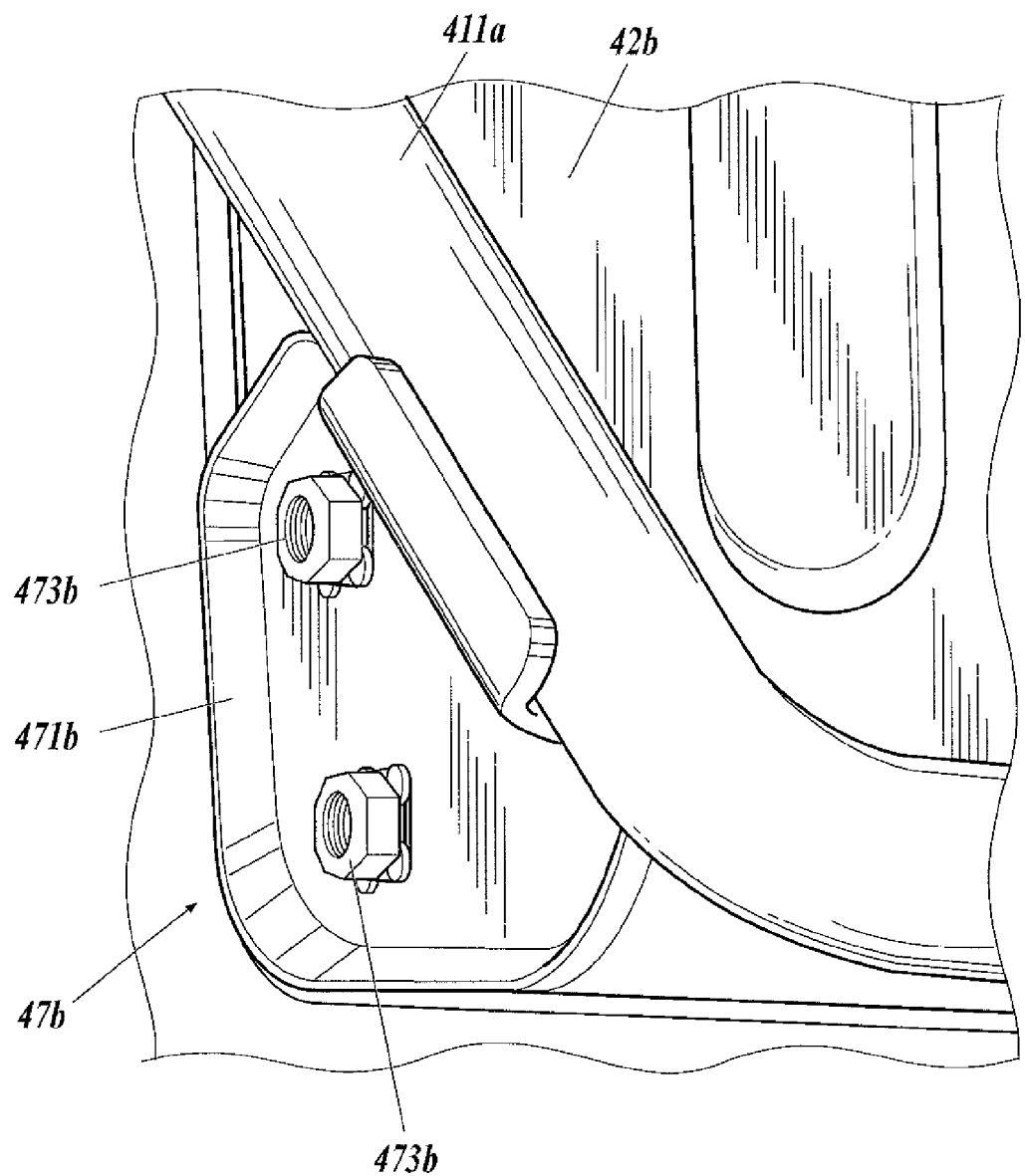
FIG. 5 This is a perspective view illustrating an outline configuration of another reinforcing member according to the present embodiment.

FIG. 5 is a perspective view illustrating an outline configuration of the reinforcing member 47b.

The reinforcing member 47b has a larger thickness than that of the back board 42b and is welded to the right lower corner of the pipe unit 411b. The reinforcing member 47b has a rib 471b along its entire periphery to enhance its entire strength. Screw units 473b for fixing the hinge unit 44b are provided in the upper and lower portions of the reinforcing member 47b. The hinge unit 44b is fixed to the back board 42b via the reinforcing member 47b to enhance the attachment strength of the hinge 44b.

As illustrated in FIG. 3, the seat back locking mechanism 5 includes a lever unit 51 provided in the upper outside of the seat back body 4, and a lock unit 52 provided in the outside of the seat back body 4 and engaging with a latched portion 115 (refer to FIG. 1) of a vehicle body. In an upright state of the seat back body 4, the lock unit 52 engages with the latched portion of the vehicle body and locks the upright state. In response to the operation of the lever unit 51, the locking between the lock unit 52 and the latched portion is released to shift the seat back body 4 to a tiltable state.

At the lower end of each of the seat back bodies 4 of the right and left stowable rear seats 1A and 1B, a rocking member 6 is provided and the rocking member 6 rocks in the anteroposterior direction in cooperation with a tilting operation of the seat back body 4 after locking of the seat back locking mechanism 5 is released. The rocking member 6 is formed by bending a metal rod into a rectangle frame extending downward. The rocking member 6 is welded at a substantial center of each of the second pipe unit 412a and the pipe unit 411b.

Each seat cushion unit 3 includes a seat cushion body 7, a seat cushion locking mechanism 8, and a shifting mechanism 9. In these components, only the seat cushion bodies 7 have different widths between the right and left stowable rear seats 1A and 1B while the seat cushion locking mechanisms 8 and the shifting mechanisms 9 have the same configurations in the right and left stowable rear seats 1A and 1B.

Each seat cushion body 7 is horizontally placed on the floor surface 100 in front of the seat back body 4 and is foldable on a foot floor surface 110 at a lower position than the floor surface 100. Hereafter, a state of the seat cushion body 7 positioned horizontally on the floor surface 100 is called a horizontal state, and a state of the seat cushion body 7 folded on the foot floor surface 110 is called a folded state. In the center back end of the seat cushion body 7, a lock shaft 71 engaging with the seat cushion locking mechanism 8 extends in the lateral direction. On the front undersurface of the seat cushion body 7, a posture maintaining unit 72 is provided to maintain the posture of the seat cushion body 7, the posture maintaining unit 72 being in contact with the foot floor surface 110 in the folded state.

As illustrated in FIG. 3, the seat cushion locking mechanism 8 is provided in the floor surface 100 so as to be placed below the seat back body 4 and in the back side of the seat cushion body 7 in the horizontal state. The seat cushion locking mechanism 8 can engage with the lock shaft 71 to lock the horizontal state of the seat cushion body 7.

The seat cushion locking mechanism 8 will now be explained in detail. FIG. 6 is a perspective view illustrating an outline configuration of the seat cushion locking mechanism 8 while FIG. 7 is a side view thereof. As illustrated in FIGS. 6 and 7, the seat cushion locking mechanism 8 includes a pair of the right and left base plates 81, a regulation pawl 82, and a ratchet unit 83. The interval H1 between the right and left base plates 81 is shorter than the width H2 of the rocking member 6. This configuration reduces the width of the base plate 81.

Each base plate 81 includes a plate board 811 having a bottom 813 fixed to the floor surface 100 with a screw 812 and a plate body 814 erecting from the inner side of the bottom 813. The plate body 814 has a cutout 815 which is vertically extending and the upper part thereof is opened.

Figure 8:
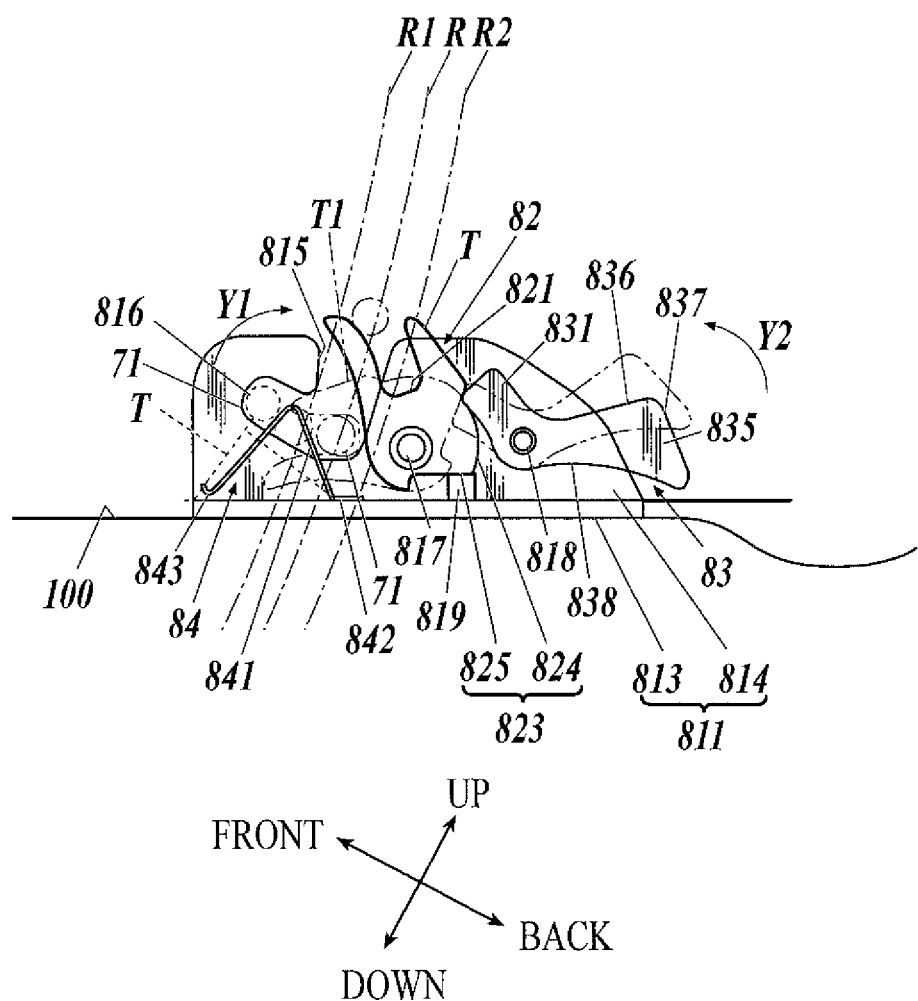
FIG. 8 This is a side view illustrating the relationship between a locus of a lock shaft and a regulation pawl according to the present embodiment.

FIG. 8 is a side view illustrating the relationship between a locus R of a lock shaft 71 and the regulation pawl 82. As illustrated in FIG. 8, the cutout 815 is provided along the locus R of the lock shaft 71. Upon shifting between the horizontal state and the folded state of the seat cushion body 7, the lock shaft 71 moves forward and backward within the cutout 815. Lines R1 and R2 in FIG. 8 indicate a variation in the locus R of the lock shaft 71. The width of the cutout 815 is determined such that the cutout 815 can fit with the lock shaft 71 despite slight shift of the locus R in the anteroposterior direction. At the lower end of the cutout 815, an auxiliary cutout 816 extends forward in continuation from the cutout 815.

Behind the cutout 815, a first rotational shaft 817 rotatably holding the regulation pawl 82 and a second rotational shaft 818 rotatably holding the rachet unit 83 bridge between the pair of the base plates 81.

At the bottom 813 of at least one base plate of the pair of the base plates 81, a hamper 84 occluding the auxiliary cutout 816 is provided in order to prevent the lock shaft 71 from entering the auxiliary cutout 816. The hamper 84 is a reversed V-shaped plate spring. The hamper 84 is placed in the anteroposterior direction so that one side 841 of the reversed V-shape occludes the portion of the auxiliary cutout 816 adjacent to the cutout 815. One end 842 of the hamper 84 is fixed at the center of the bottom 813 of the base plate 81 while the other end 843 is separated from the bottom 813. For example, if a luggage on a loading space collides with the seat back body 4 from the back due to head-on collision, the lock shaft 71 comes into contact with the side 841 of the hamper 84. If a load greater than or equal to a predetermined level is applied to the hamper 84 at this time, the hamper 84 deforms and opens the auxiliary cutout 816 (refer to a dotted line T in FIG. 8). A predetermined load required for deforming the hamper 84 can be adjusted by varying the thickness or elastic modulus of the plate spring of the hamper 84.

On the bottom 813 of the base plate 81, a detachment stopper 85 is attached for preventing the detachment of the hamper 84 from the plate body 814 of the base plate 81 due to the deformation of the hamper 84. The detachment stopper 85 is a plate member and extends in the anteroposterior direction beside the other end 843 of the hamper 84. The other end 843 of the hamper 84 is disposed between the plate body 814 and the detachment stopper 85. If the hamper 84 deforms to move in the anteroposterior direction, the detachment stopper 85 prevents the hamper 84 from shifting in the direction away from the plate body 814.

If a luggage clashes with the back side of the stowable rear seats 1A and 1B to move the entire rear seats forward, the lock shaft 71 deforms the hamper 84 to enter the auxiliary cutout 816. Since upward movement of the lock shaft 71 is regulated by entering into the auxiliary cutout 816, the seat cushion body 7 itself is also locked in the horizontal state. In this way, even if a luggage clashes with the back side to tilt the seat back body 4, the seat cushion body maintains the locked state. This can prevent unlocking in cooperation with the tilt of the seat back body 4.

The regulation pawl 82 is rotatably attached to the base plate 81 by the first rotational shaft 817. The regulation pawl 82 has a concave portion 821 at its tip to engage with the lock shaft 71. A state of the lock shaft 71 engaged into the concave portion 821 and the tip oriented substantially frontward is called a regulated state (refer to a chain line T1 illustrated in FIG. 8). A state of the lock shaft 71 detached from the inside of the concave portion 821 and the tip oriented substantially upward is called a released state (refer to a solid line T2 illustrated in FIG. 8). The regulation pawl 82 is always applied with a biasing force by the biasing spring 822 in a direction Y1 enabling the released state.

The base end of the regulation pawl 82 is provided with a cam surface 823 to engage with the ratchet unit 83. The cam surface 823 includes a first arcuate cam surface 824 and a second flat cam surface 825 continuously extending downward from the first cam surface 824. In the regulated state, the second cam surface 825 is latched by the ratchet unit 83 to regulate further rotation caused by the biasing spring 822. In the released state, the second cam surface 825 is latched by a stopper 819 provided on the bottom 813 of the base plate 81 to regulate further rotation caused by the biasing spring 822.

If the lock shaft 71 guided by the cutout 815 engages with the concave portion 821 of the regulation pawl 82 in the released state, the regulation pawl 82 is rotated urged by the lock shaft 71. This rotation causes the regulation pawl 82 to occlude the upside of the lock shaft 71, regulating the upward movement of the lock shaft 71 to lead to the regulated state. At this time, the regulated state is locked by the ratchet unit 83.

The ratchet unit 83 is rotatably attached to the base plate 81 by the second rotational shaft 818. The ratchet unit 83 engages with the regulation pawl 82 to thereby lock/release the regulated state of the regulation pawl 82. The end 831 of the ratchet unit 83 engages with the cam surface 823 of the regulation pawl 82 and has an end surface functioning as the cam surface 832. The ratchet unit 83 is always urged in a direction Y2 locking the regulation pawl 82 by a biasing spring 89 functioning as a biasing member. The biasing spring 89 is a torsion spring attached to the second rotational shaft 818.

Figure 9A:
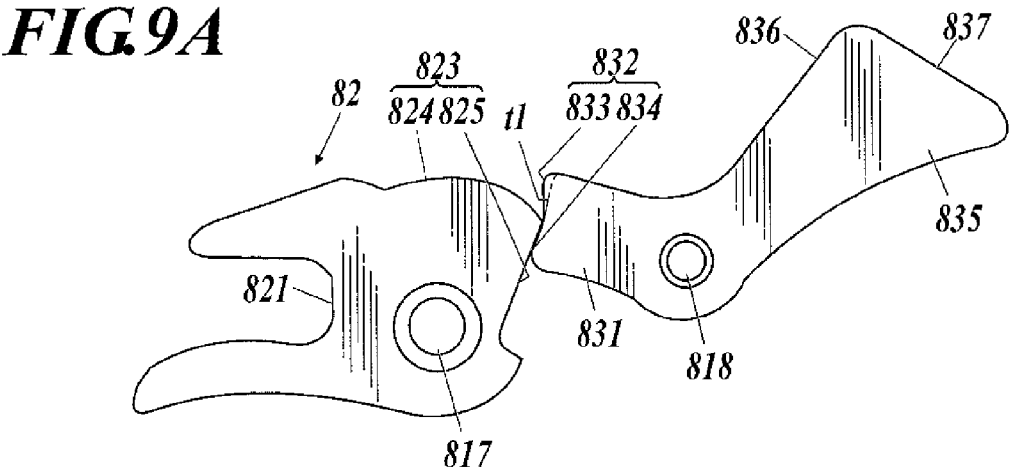
FIG. 9A This is a schematic diagram illustrating the relationship between a cam surface of a ratchet unit and a cam surface of the regulation pawl according to the present embodiment.
Figure 9B:
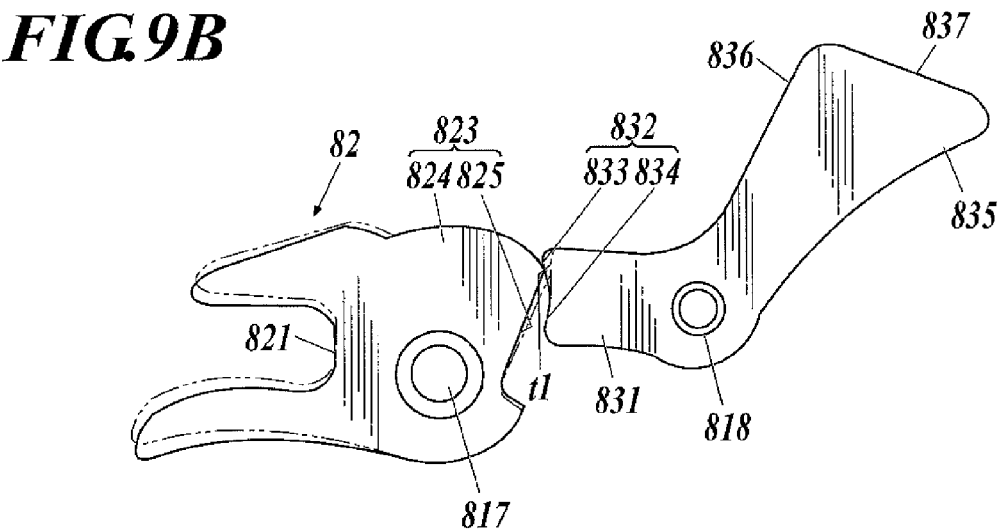
FIG. 9B This is a schematic diagram illustrating the relationship between the cam surface of the ratchet unit and the cam surface of the regulation pawl according to the present embodiment.
Figure 9C:
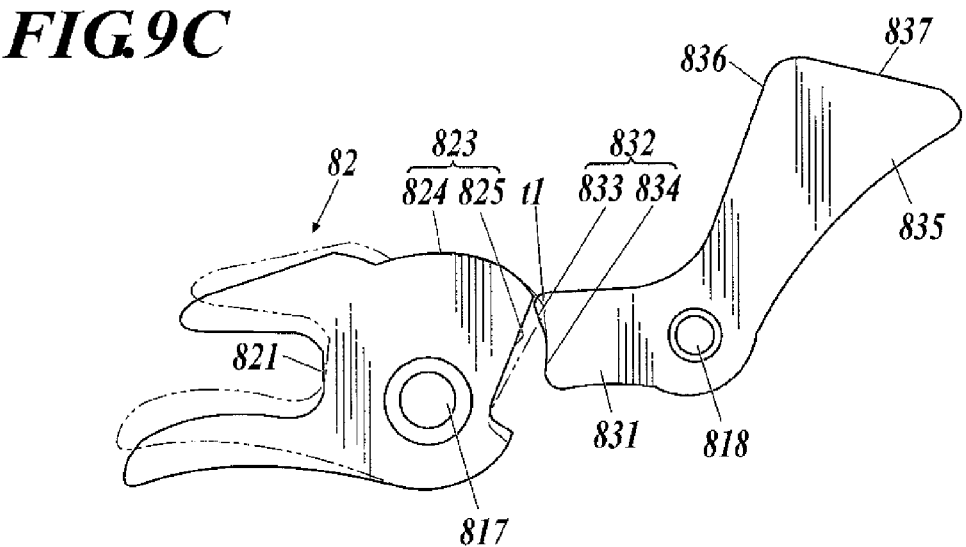
FIG. 9C This is a schematic diagram illustrating the relationship between the cam surface of the ratchet unit and the cam surface of the regulation pawl according to the present embodiment.

FIG. 9 shows schematic diagrams illustrating the relationship between the cam surface 832 of the ratchet unit 83 and the cam surface 823 of the regulation pawl 82. The cam surface 832 of the ratchet unit 83 has an upper portion 833 inclined so as to project from a lower portion 834 towards the regulation pawl 82. During the rotation of the regulation pawl from the released state to the regulated state, the engagement position of the cam surface 832 of the ratchet unit 83 shifts from the first cam surface 824 to the second cam surface 825 of the regulation pawl 82, as illustrated in FIG. 9A. At this time, if the cam surface 832 of the ratchet unit 83 is flat, the rotation path of the regulation pawl 82 after the shifting is indicated by two-dot chain lines t1 in FIGS. 9B and 9C. If the upper portion 833 of the cam surface 832 of the ratchet unit 83 is further inclined so as to project from the lower portion 834 towards the regulation pawl 82 as described above, the regulation pawl 82 after the shifting is further rotated along the rotation path than those indicated by the two-dot chain lines t1 in FIGS. 9B and 9C. That is, the ratchet unit 83 pushes the regulation pawl 82 toward the cutout 815 to lock the regulated state of the regulation pawl 82, enabling a more robust regulated state.

Figure 10:
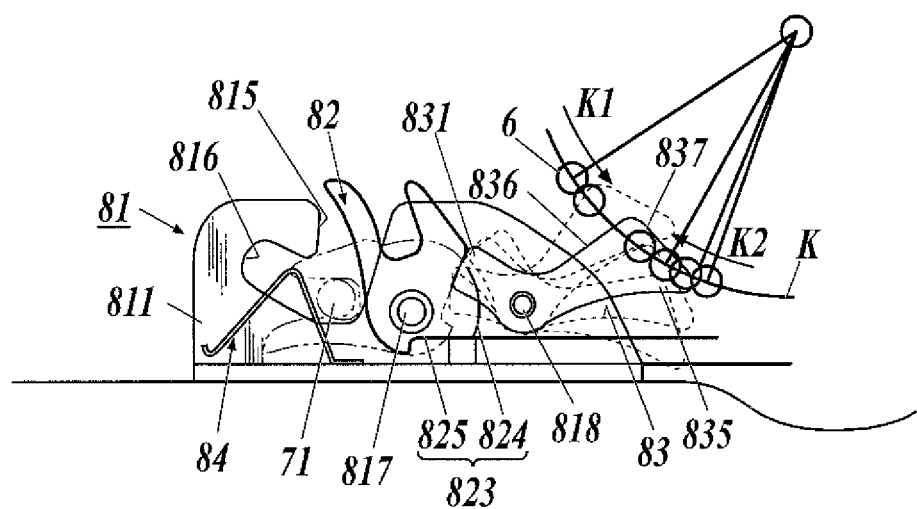
FIG. 10 This is a sideview illustrating the relationship between the rocking path of the rocking member and the ratchet unit according to the present embodiment.

FIG. 10 is a side view illustrating the relationship between the rocking path K of the rocking member 6 and the ratchet unit 83. As illustrated in FIG. 10, the rocking member 6 rocks just outside of the base plate 81 on the rocking path K without interference with the base plate 81. The other end 835 of the ratchet unit 83 is placed on the rocking path K of the rocking member 6. In the other end 835 including the upper surface having a substantially reversed V-shape, a surface adjacent to the second rotational shaft 818, i.e., the inner surface is called a first urging surface 836, the outer surface that is the tip surface of the other end 835 is called a second urging surface 837, and the lower surface facing the first urging surface 836 is called an opposite surface 838. The other end 835 of the ratchet unit 83 has such a shape that a part of the first urging surface 836 projects outward from the base plate 81. With respect to the other end 835 of the ratchet unit 83, the width between the first urging surface 836 and the opposite surface 838 becomes wider gradually as the distance from the second rotational shaft 818 becomes further. The opposite surface 838 is provided with a concave portion 839 for latching one end 891 of the biasing spring 89. The concave portion 839 is formed in a portion wider than the basis end of the other end 835 of the ratchet unit 83. This can prevent a decrease in the rigidity of the ratchet unit 83 due to the provision of the concave portion 839. The concave portion 839 is placed outside the base plate 81. This configuration can prevent the base plate 81 from obstructing the attachment of the biasing spring 89.

When the seat back body 4 is tilted from the upright state, the first urging surface 836 traverses the rocking path K1 of the rocking member 6 in the tilted state so as to be pushed by the rocking member 6. In contrast, when the seat back body 4 erects from the tilted state, the second urging surface 837 traverses the rocking path K2 of the rocking member 6 in the upright state so as to be pushed by the rocking member 6. The rocking member 6, which is a downward rectangle frame as described above, can stably urges the first and second urging surfaces 836 and 837 compared to, for example, an L-shaped or rod rocking member.

The first and second urging surfaces 836 and 837 urged by the rocking member 6 rotate the rachet unit 83 in a direction opposite to the urged direction Y2 to retract the rachet unit 83 from the rocking path K. As a result, the rachet unit 83 can be retracted from the rocking path K when the seat back body 4 is tilted from the upright state or when it erects from the tilted state. In other words, even if the rocking member 6 contacts the other end 835 of the rachet unit 83 on the rocking path K during the erection of the seat back body 4 from the tilted state, the rachet unit 83 can be smoothly retracted from the rocking path K and enables a smooth erection operation.

In the upright state of the seat back body 4, the rocking member 6 is detached from the rachet unit 83 of the seat cushion locking mechanism 8. In the tilted state of the seat back body 4, the rocking member 6 contacts the other end 835 of the rachet unit 83 and releases the lock of the seat cushion locking mechanism 8.

In this embodiment, the distance m from the cam surface 832 of the end 831 of the rachet unit 83 to the center of the second rotational shaft 813 is shorter than the distance n from a position of the rocking member 6 contacting the first urging surface 836 of the rachet unit 83 to the center of the second rotational shaft 818.

As illustrated in FIG. 7, the regulation pawl 82 in the regulated state is locked since the second cam surface 825 of the regulation pawl 82 engages with the cam surface 832 of the ratchet unit 83. When the seat back body 4 is tilted from the upright state in the locked state, the rocking member 6 rocks in the direction of the arrow Y3, urges the first urging surface 836 of the ratchet unit 83 against the biasing force of the biasing spring, and rotates the ratchet unit 83 in the direction of the arrow Y4. This rotation releases the lock to rotate the regulation pawl 82 in the direction of the arrow Y5 due to the biasing force of the biasing spring 822, releases the regulation of the lock shaft 71, and leads to the released state.

Figure 12:
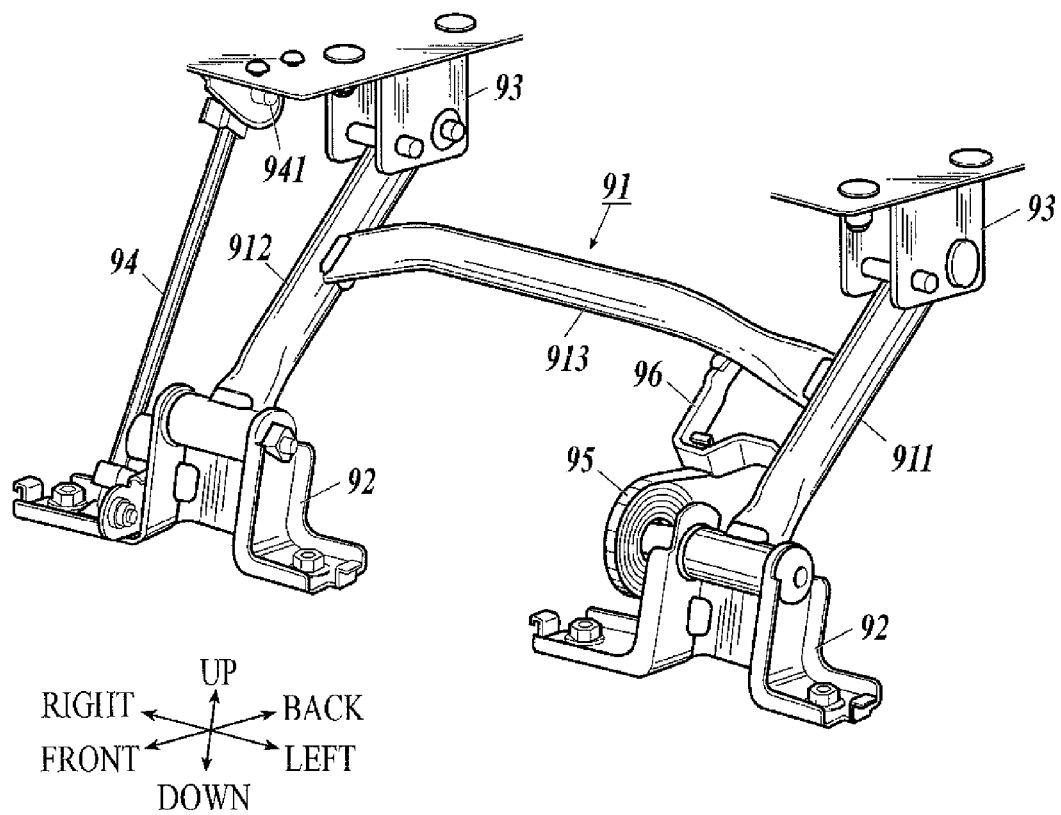
FIG. 12 This is a perspective view as diagonally viewed from the left front, illustrating the outline configuration of the shifting mechanism in the horizontal state of the seat cushion body according to the present embodiment.
Figure 13:
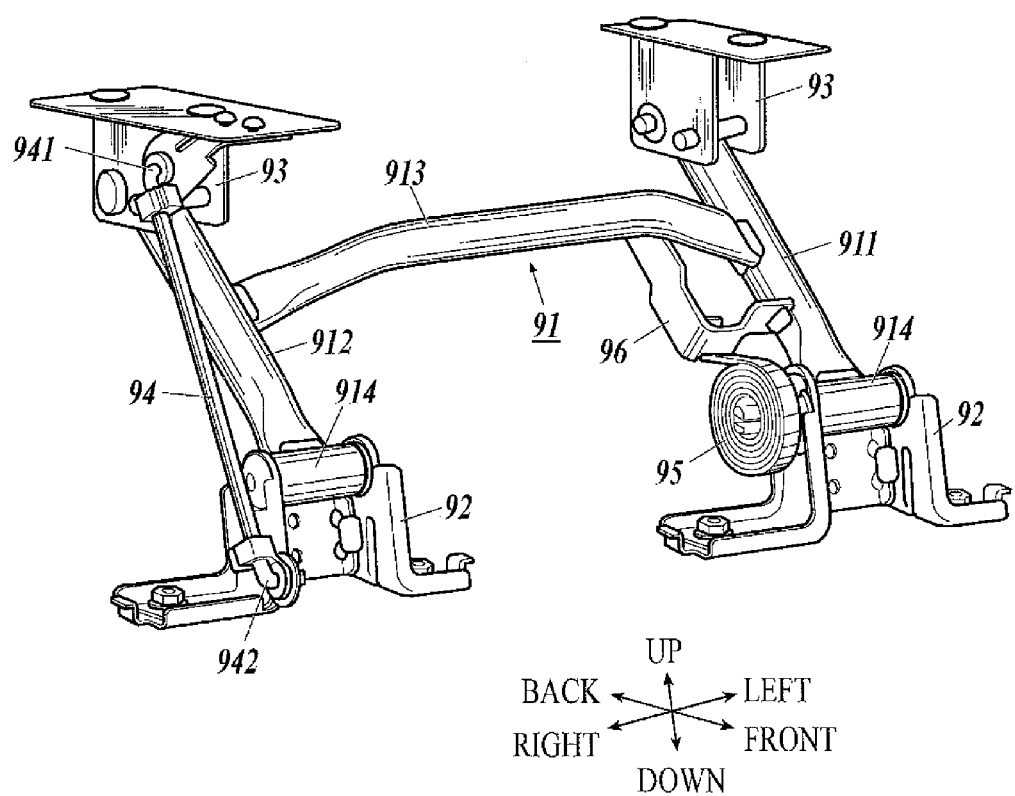
FIG. 13 This is a perspective view as diagonally viewed from the right front, illustrating the outline configuration of the shifting mechanism in the horizontal state of the seat cushion body according to the present embodiment.

The shifting mechanism 9 shifts the seat cushion body 7 between the horizontal state and the folded state. FIG. 11 is a front view illustrating an outline configuration of the shifting mechanism 9 in the horizontal state of the seat cushion body 7. FIG. 12 is a perspective view as diagonally viewed from the left front. FIG. 13 is a perspective view as diagonally viewed from the right front. As illustrated in FIGS. 11 to 13, the shifting mechanism 9 includes a frame unit 91, foot-side bearing units 92, seat-side bearing units 93, a guide member 94, and a rotation urging unit 95.

Figure 14A:
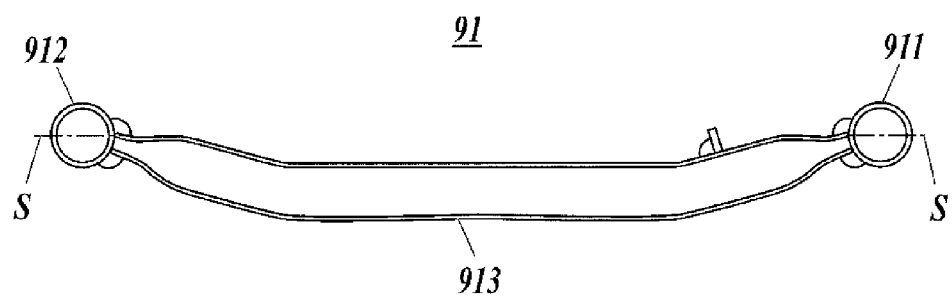
FIG. 14A This illustrates an outline configuration of a frame unit according to the present embodiment and a sectional view of the unit taken along a line a-a in FIG. 14B.
Figure 14B:
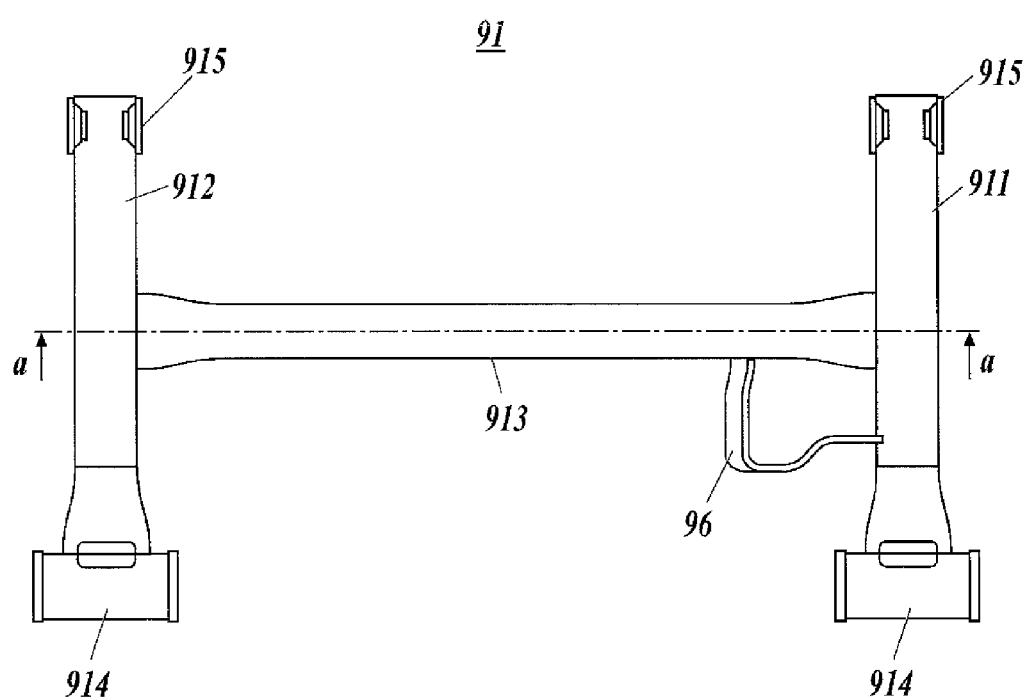
FIG. 14B This is a front view illustrating the outline configuration of the frame unit according to the present embodiment.

FIG. 14A illustrates an outline configuration of the frame unit 91. FIG. 14A is a sectional view of the unit taken along a line a-a in FIG. 14B while FIG. 14B is a front view thereof. As illustrated in FIGS. 14A and 14B, the frame unit 91 includes a pair of parallel legs 911 and 912 and a connection frame 913 connecting the pair of legs 911 and 912.

At the lower end of each of the legs 911 and 912 composed of a metal pipe, a rotational shaft unit 914 is supported by a foot-side bearing unit 92. At each upper end of the legs 911 and 912, a pivot hole 915 is rotatably supported by the seat-side bearing unit 93.

The connection frame 913 is attached at the longitudinal center of the paired legs 911 and 912. As illustrated in FIGS. 12 and 13, the connection frame 913 curves so as to project forward in the horizontal state of the seat cushion body 7. As illustrated in FIG. 14A, both ends of the connection frame 913 are fixed by, for example, welding at the position shifted in the projecting direction of the connection frame 913, from the center S of the cross section orthogonal to the longitudinal direction of the legs 911 and 912.

A bias engagement member 96 for engaging with the rotation urging unit 95 has a substantial L shape viewed from the front and is attached to the left leg 911 and the connection frame 913 by, for example, welding.

As illustrated in FIGS. 11 to 13, a pair of foot-side bearing units 92 is provided for each of the paired legs 911 and 912 and mounted on the foot floor surface 110 with a predetermined interval between the foot-side bearing units 92 in the lateral direction. Seat-side bearing units 93 are provided for the respective paired legs 911 and 912 and fixed to the undersurface of the seat cushion body 7 with a predetermined interval in the lateral direction. This enables guiding between the horizontal state and the folded state while the paired legs 911 and 912 support the seat cushion body 7.

A guide member 94 is placed outside the paired legs 911 and 912, that is on the right side of the paired legs 911 and 912, i.e., adjacent to the center of the vehicle. The guide member 94 guides the seat cushion body 7 between the horizontal state and the folded state together with the paired legs 911 and 912. The guide member 94 is formed by bending both ends of a metal round rod. The upper end of the guide member 94 serves as a rotational shaft 941 by being supported by the seat-side bearing unit 93 in the horizontal position. The lower end of the guide member 94 serves as a rotational shaft 942 by being supported by the foot-side bearing units 92 in the horizontal position. The rotational shaft 941 of the guide member 94 adjacent to the seat cushion body 7 is placed further forward than the rotational shafts of the paired legs 911 and 912 adjacent to the seat cushion body 7. In contrast, the rotational shaft 942 of the guide member 94 adjacent to the foot floor surface 110 is placed further forward and downward than the rotational shafts of the paired legs 911 and 912 adjacent to the foot floor surface 110. This geometry enables smooth folding of the seat cushion body 7 into a substantially horizontal posture during the folded state.

The rotation urging unit 95 applies rotational force to at least one leg 911 of the paired legs 911 and 912 when guiding the seat cushion body 7 from the horizontal state to the folded state. The rotation urging unit 95 is a flat spiral spring placed inside the paired legs 911 and 912 and at a portion of the leg 911 adjacent to the foot floor surface 110. The rotation urging unit 95 has an inner end fixed to the left foot-side bearing units 92 and an outer end engaging with the bias engagement member 96. In the horizontal state of the seat cushion body 7, the outer end of the rotation urging unit 95 engages with the bias engagement member 96 to apply biasing force to the left leg 911. The outer end of the rotation urging unit 95 is detached from the bias engagement member 96 halfway through guiding of the seat cushion body 7 from the horizontal state to the folded state.

A detailed operation of the shifting mechanism 9 will be explained. FIG. 15 is a schematic side view illustrating the operation of the shifting mechanism 9. Solid lines in FIG. 15 indicate the seat cushion body 7 and the shifting mechanism 9 in the horizontal state while two-dot chain lines indicate the seat cushion body 7 and the shifting mechanism 9 during a shifting operation. The seat cushion locking mechanism 8 is unlocked from the horizontal state to then release the rotation urging unit 95. As a result, biasing force of the rotation urging unit 95 rotates the legs 911 and 912 forward and also moves the seat cushion body 7 forward. During this movement, the guide member 94 reduces the rattle of the seat cushion body 7. Additionally, since the connection frame 913 has such a curved shape as to project forward in the horizontal state of the seat cushion body 7, the space at the center between the connection frame 913 and the seat cushion body 7 can be secured before the paired legs 911 and 912 guide the seat cushion body 7 from the horizontal state to the folded state. This can prevent contact of the connection frame 913 with the seat cushion body 7 in a folding operation and enables to perform a smooth folding operation for the seat cushion body 7. Since the connection frame 913 projects downward after the folding, the seat cushion body 7 can be placed downward to use a space more effectively.

Since the rotation urging unit 95 is detached from the bias engagement member 96 halfway through guiding of the seat cushion body 7 from the horizontal state to the folded state, no biasing force is applied to the paired legs 911 and 912 after the detaching to move the seat cushion body 7 with a decrease in the rotational force. As a result, the posture maintenance unit 72 comes into contact with the foot floor surface 110 to then complete the shifting operation and lead to the folded state of the seat cushion body 7. During the folded state, the seat cushion body 7 is maintained in a substantially horizontal posture by the guide member 94 and the posture maintenance unit 72.

Figure 16:
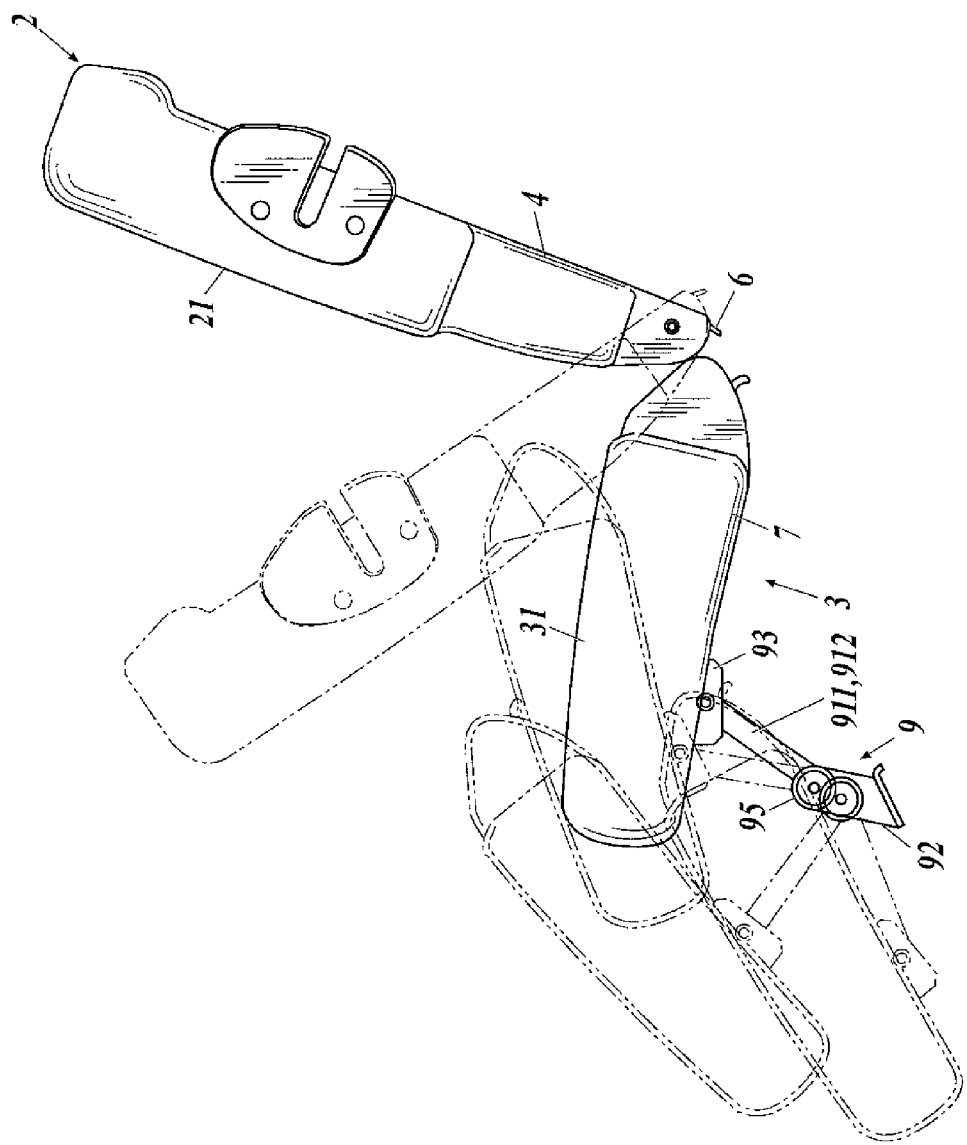
FIG. 16 This is a schematic side view illustrating the operation of a seat back unit and a seat cushion unit according to the present embodiment.

The cooperation of the seat back unit 2 and the seat cushion unit 3 during the folding operation will be explained. FIG. 16 is a schematic side view illustrating the operation of the seat back unit 2 and the seat cushion unit 3. Solid lines in FIG. 16 indicate the seat back unit 2 and the seat cushion unit 3 in the seatable state (horizontal state) while two-dot chain lines indicate the seat back unit 2 and the seat cushion unit 3 during the folding operation. If the seat back locking mechanism 5 is unlocked from the seatable state to tilt the seat back body 4, the rocking member 6 unlocks the seat cushion locking mechanism 8 before the complete folding. This applies the biasing force of the rotation urging unit 95 to the paired legs 911 and 912 to rotate the paired legs 911 and 912. Thereby, the seat cushion body 7 shifts from the horizontal state to the folded state. If the seat cushion body 7 reaches the folded state, a user folds the seat back body 4 completely to finish the folding operation.

According to the present embodiment as described above, the seat cushion locking mechanism 8 is unlocked when the rocking member 6 rocks in cooperation with the tilting of the seat back body 4 from the upright state. As a result, the seat cushion locking mechanism 8 is unlocked in cooperation with the tilting operation of the seat back body 4. This can eliminate a manual unlocking operation of the seat cushion locking mechanism 8 and simplify the stowing operation compared to manually unlocking each of the seat back unit 2 and the seat cushion unit 3.

The rocking member 6 is detached from the seat cushion locking mechanism 8 in the upright state of the seat back body 4 and comes into contact with the seat cushion locking mechanism 8 to unlock the seat cushion locking mechanism 8 when the seat back body 4 is to be tilted. This can provide an allowance required for the unlocking operation. The unlocking can thereby be prevented even if the seat back body 4 tilts slightly by, for example, the vibration of the vehicle.

If the seat cushion locking mechanism 8 is unlocked, the shifting mechanism 9 shifts the seat cushion body 7 from the horizontal state to the folded state. This also allows a folding operation for the seat cushion body 7 in cooperation with the tilting of the seat back body 4. The stowing operation can thereby be further simplified.

Additionally, the rocking member 6 is detached from the seat cushion locking mechanism 8 in the upright state of the seat back body 4 to prevent abnormal noise caused by the contact between these two components.

In recent years, it has been awaited for a technique to smoothly return a seat back to the upright state even when the seat back is halfway tilted from a perspective of improvement in usability.

That is, it has been awaited for a stowable rear seat which can smoothly be returned to the upright state even before the seat back is folded completely to be provided.

In the present embodiment to meet this request, the rocking member 6 urges one of the first and second urging surfaces 836 and 837 to rotate the ratchet unit 83 in a direction opposite to the urged direction to retract the ratchet unit 83 from the rocking path K, the first urging surface 836 being urged by the rocking member 6 when the seat back body 4 is tilted from the upright state, the second urging surface 837 being urged by the rocking member 6 when the seat back body 4 erects from the tilted state. As a result, the ratchet unit 83 can be retracted from the rocking path K when the seat back body 4 is tilted from the upright state or when it erects from the tilted state. In other words, even if the rocking member 6 contacts the other end 835 of the ratchet unit 83 on the rocking path K during the erection of the seat back body 4 from the tilted state, the ratchet unit 83 can be smoothly retracted from the rocking path K and enables a smooth erection operation. That is, the stowable rear seat can smoothly be returned to the upright state even just before the seat back body 4 is folded completely.

At least one of the cam surface 823 of the regulation pawl 82 and the cam surface 832 of the end 831 of the ratchet unit 83 has such a shape that the ratchet unit 83 pushes the regulation pawl 82 toward the cutout 815 to lock the regulated state of the regulation pawl 82; hence, the lock shaft 71 can be firmly held by the regulation pawl 82 being pushed toward the cutout 815 during the locking.

The distance m from the cam surface 832 of the end 831 of the rachet unit 83 to the center of the second rotational shaft 813 of the rachet unit 83 is shorter than the distance n from a position of the rocking member 6 contacting the first urging surface 836 to the second rotational shaft 818; hence, the principle of leverage can be applied to reduce the urging force from the rocking member 6 required for the operation of the rachet unit 83. This configuration can release the lock by the seat cushion locking mechanism 8 with small force.

The first urging surface 836 urged by the rocking member 6 rocking outside the base plate 81 projects outward from the base plate 81 to prevent the interference of the rocking member 6 with the base plate 81. A configuration including the rocking member 6 coming into contact with the first urging surface 836 inside the base plate 81 requires such a large base plate 81 as to allow entry of the rocking member 6. In contrast, a rocking member 6 coming into contact with the first urging surface 836 outside the base plate 81 can avoid an increase in the size of the base plate with no need to consider the entry of the rocking member 6.

The width of the other end 835 of the rachet unit 83 becomes wider as distancing away from the second rotational shaft 818. This configuration can increase the area of the second urging surface 837 formed on the tip surface of the other end 835. The surface for guiding the rocking member 6 thereby increases when the rocking member 6 urges the second urging surface 837 during shifting from the tilted state to the upright state. This can stabilize the operation of the rachet unit 83.

In recent years, mechanisms have been developed which move a seat cushion to a foot floor surface in cooperation with the tilting operation of a seat back. Manual adjustment is however necessary even after the folding operation depending on the state of the seat cushion.

That is, it is awaited for a technique to provide a smooth folding operation of a seat cushion and reduce the manual adjustment when the seat cushion is moved in cooperation with the tilting operation of a seat back.

In order to meet this request, the present embodiment includes the guide member 94 guiding the seat cushion body 7 between the horizontal state and the folded state together with the paired legs 911 and 912. This can prevent the rattle of the seat cushion body 7 during the folding operation. As a result, when the seat cushion body 7 is moved in cooperation with the tilting operation of the seat back unit 2, the seat cushion body 7 can be smoothly folded and the manual adjustment can be reduced.

Both ends of the rod member forming the guide member 94 function as the rotational shafts 941 and 942; hence, the guide member 94 can be integrally formed with the rotational shafts 941 and 942 to enhance the stability of the operation. This can also reduce the number of parts and improve the assembling work efficiency.

The rotational shaft 941 of the guide member 94 adjacent to the seat cushion body 7 is placed further forward than the rotational shafts of the paired legs 911 and 912 adjacent to the seat cushion body 7. Additionally, the rotational shaft 942 of the guide member 94 adjacent to the foot floor surface 110 is placed further forward and downward than the rotational shafts of the paired legs 911 and 912 adjacent to the foot floor surface 110. This geometry enables the seat cushion body 7 to be smoothly disposed at a substantially horizontal posture during the folded state on the foot floor surface 110.

The guide member 94 is provided outside the paired legs 911 and 912; hence, the paired legs 911 and 912 do not interfere with the guide member 94 to secure a smooth operation.

Because the guide member 94 is placed outside the paired legs 911 and 912 and adjacent to the center of the vehicle body, a passenger can be prevented from contacting the guide member 94.

The rotation urging unit 95 applies rotational force to at least one leg 911 when the seat cushion body 7 is guided from the horizontal state to the folded state. Therefore, the rotational force can automatically move the seat cushion body 7 to the folded state. This configuration can provide a smooth folding operation of the seat cushion unit 3.

The connection between the rotation urging unit 95 and at least one leg 911 is released before the seat cushion body 7 reaches the folded state. This configuration can intercept the transfer of biasing force halfway through the folding operation of the seat cushion body 7 to transit the seat cushion body 7 to the folded state by remaining force. As a result, shock can be eased when the seat cushion body 7 contacts with the foot floor surface 100.

The rotation urging unit 95 is placed inside the paired legs 911 and 912 and can therefore be protected by the legs 911 and 912. This configuration can stabilize the operation over a long period of time.

The rotation urging unit 95 is placed adjacent to the foot floor surface 110 in the legs 911 and 912 to therefore connect the rotation urging unit 95 to a portion having high rigidity in the legs 911 and 912. This configuration can stabilize the operation of the rotation urging unit 95.

The present invention can also be applicable to any other embodiment other than the above embodiments. Proper modifications can be applied without departing from the scope and spirit of the present invention.

For example, the embodiment described above exemplifies the auxiliary cutout 816 extending forward. Alternatively, if the direction of the load by shock from the back of the seat back body 4 is different from the anteroposterior direction, the auxiliary cutout 816 is preferably parallel to the direction of the load. Thereby, when the entire stowable rear seat 1 moves forward in response to shock from the back, the lock shaft 71 can easily be fit into the auxiliary cutout 816.

Figure 17:
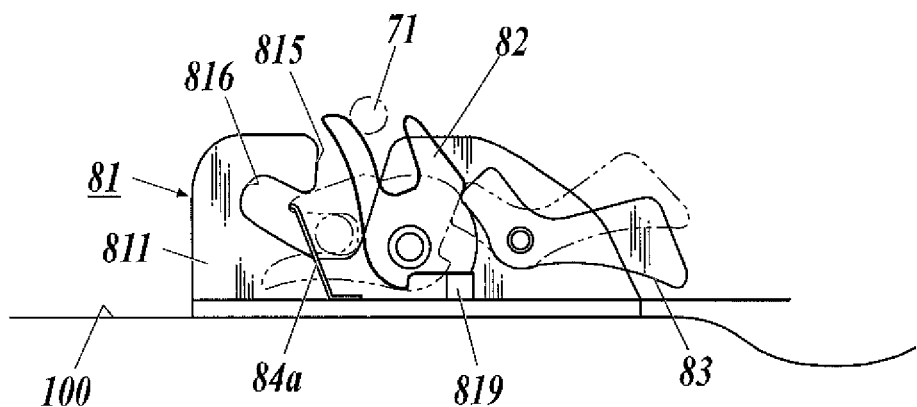
FIG. 17 This is a side view illustrating a modification of a hamper in FIG. 8.

As illustrated in FIG. 17, the reversed V-shape hamper 84 can be replaced with at least a hamper 84a including a plate spring projecting upwards so as to occlude the auxiliary cutout 816.

Figure 18:
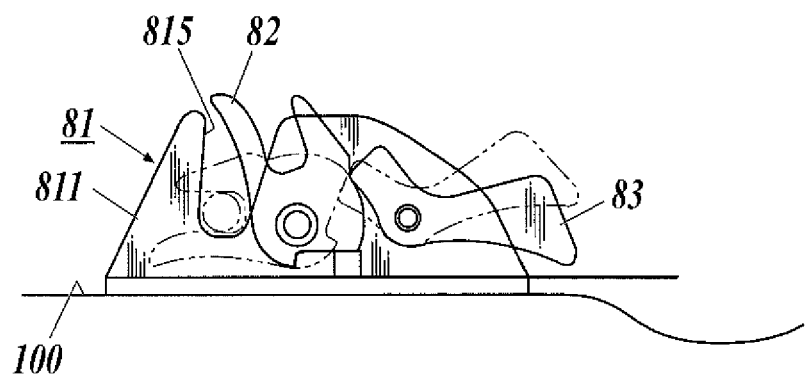
FIG. 18 This is a side view illustrating a modification of a base plate in FIG. 8.

If collision from the back is ignored, the auxiliary cutout 816 and the hamper 84 may be omitted as illustrated in FIG. 18. This can reduce the production steps and the parts of the base plate 81.

The preceding embodiment exemplifies the guide member 94 composed of a round rod, but may be any rod such as a square rod or a pipe beside the round rod.

Although the preceding embodiment exemplifies the shifting mechanism 9 including a single rotation urging unit 95, multiple rotation urging units may be provided. A shifting mechanism 9C including multiple rotation urging units will now be explained in detail. In the following description, the same elements as those in the preceding embodiment are designated with the same reference numerals.

Figure 20:
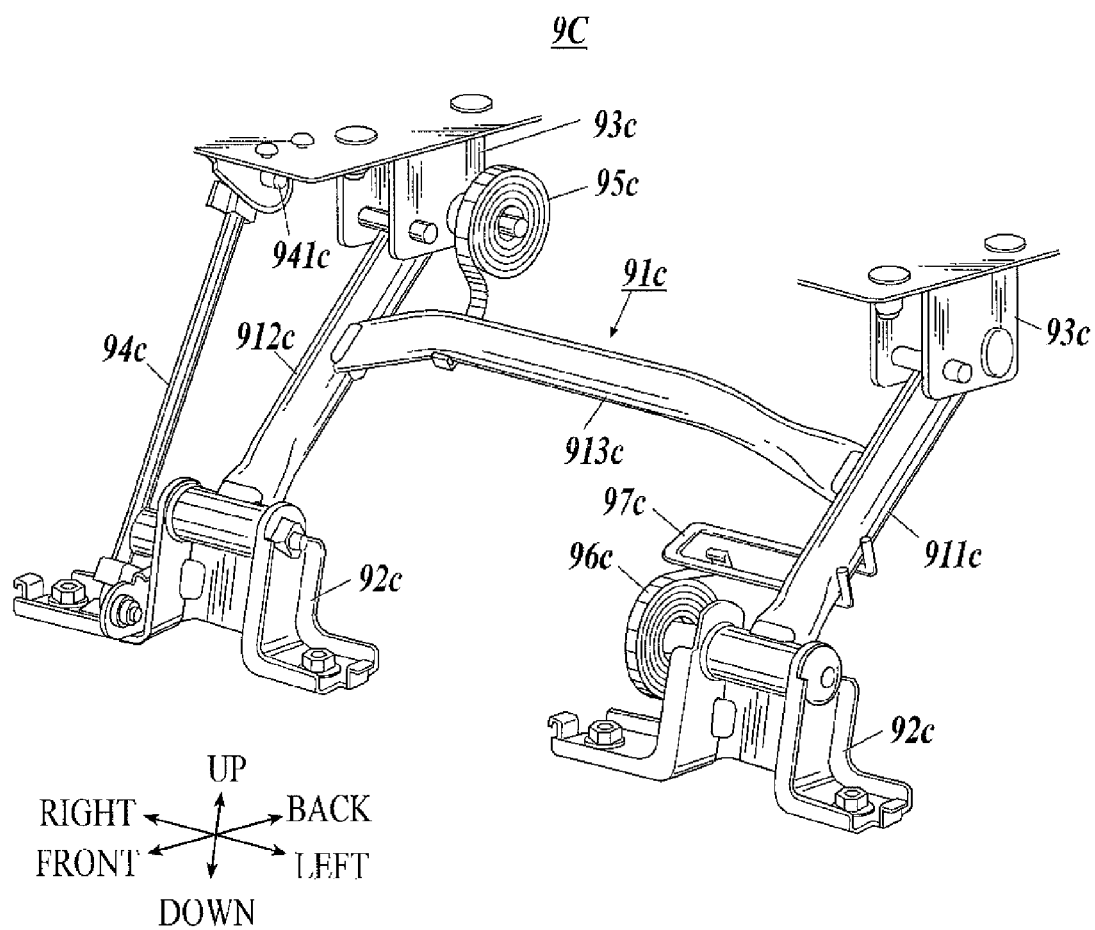
FIG. 20 This is a perspective view as diagonally viewed from the left front, illustrating the modification of the shifting mechanism.
Figure 21:
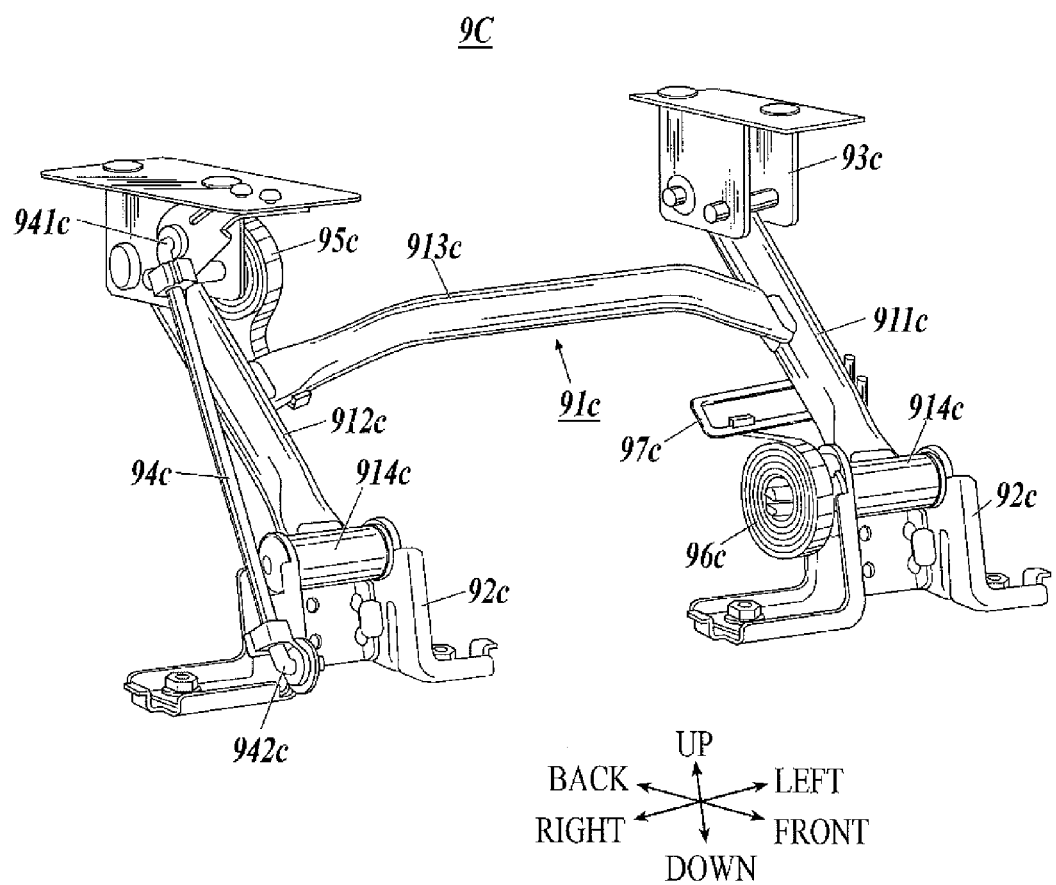
FIG. 21 This is a perspective view as diagonally viewed from the right front, illustrating the modification of the shifting mechanism.

FIG. 19 is a front view illustrating an outline configuration of the shifting mechanism 9C in the horizontal state of the seat cushion body 7. FIG. 20 is a perspective view as diagonally viewed from the left front. FIG. 21 is a perspective view as diagonally viewed from the right front. As illustrated in FIGS. 19 to 21, the shifting mechanism 9C includes a frame unit 91c, a foot-side bearing unit 92c, a seat-side bearing unit 93c, a guide member 94c, a first rotation urging unit 95c, and a second rotation urging unit 96c.

Figure 22A:
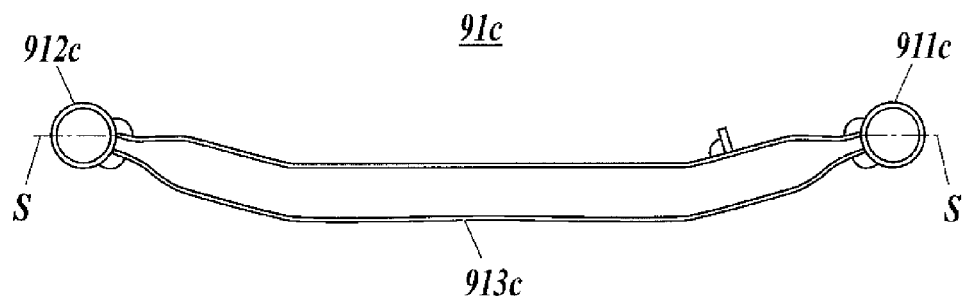
FIG. 22A This illustrates an outline configuration of a frame unit of the shifting mechanism in FIG. 19 and is a sectional view of the unit taken along a line a-a in FIG. 22B.
Figure 22B:
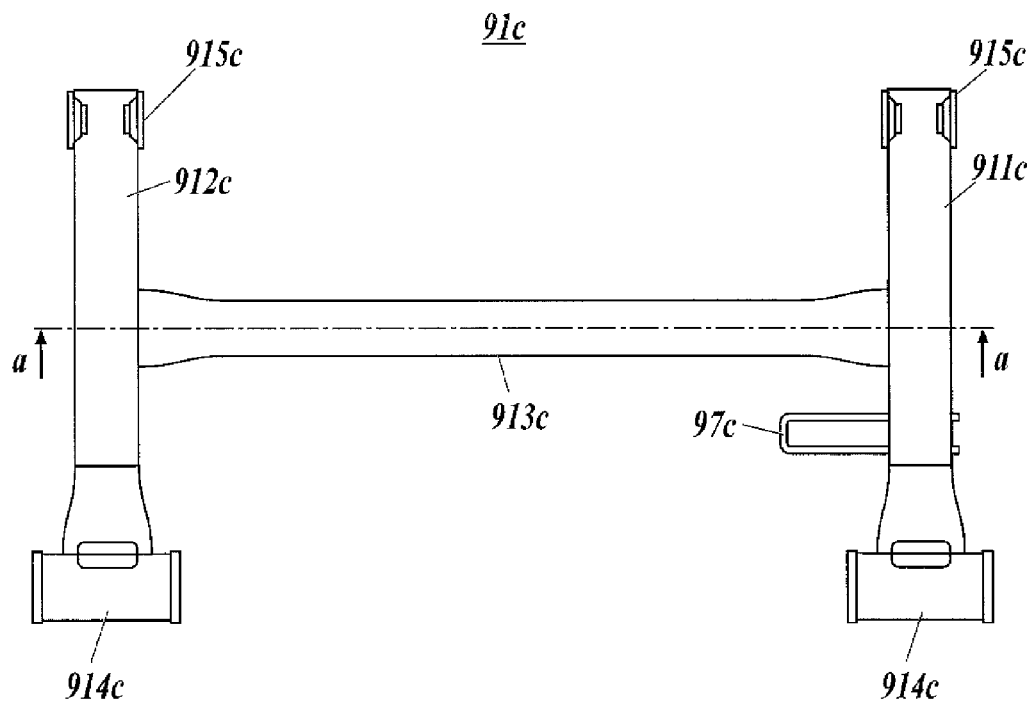
FIG. 22B This is a front view illustrating the outline configuration of the frame unit in FIG. 22A.

FIG. 22 illustrates outline configurations of the frame unit 91c. FIG. 22A is a sectional view of the unit taken along a line a-a in FIG. 22B while FIG. 22B is a front view thereof. As illustrated in FIGS. 22A and 22B, the frame unit 91c includes a pair of parallel legs 911c and 912c and a connection frame 913c connecting the paired legs 911c and 912c.

In the lower end of each of the legs 911c and 912c composed of a metal pipe, a rotational shaft unit 914c is supported by a foot-side bearing unit 92c. In the upper end of each of the legs 911c and 912c, a pivot hole 915c is rotatably supported by the seat-side bearing unit 93c.

The connection frame 913c is attached at the longitudinal centers of the paired legs 911c and 912c. As illustrated in FIGS. 20 and 21, the connection frame 913c curves so as to project forward in the horizontal state of the seat cushion body 7. As illustrated in FIG. 22A, both ends of the connection frame 913c are fixed by, for example, welding at the position shifted in the projecting direction of the connection frame 913, from the center S of the cross section orthogonal to the longitudinal direction of the legs 911c and 912c.

Adjacent to the foot floor surface 110 in the left leg 911c, a substantially U-shaped bias engagement member 97c for engaging with the second rotation urging unit 96c is attached by, for example, welding.

As illustrated in FIGS. 19 to 21, a pair of foot-side bearing units 92c is provided for each of the paired legs 911c and 912c and mounted on the foot floor surface 110 with a predetermined interval between the foot-side bearing units 92c in the lateral direction. Seat-side bearing units 93c are provided for the respective legs 911c and 912c and fixed to the undersurface of the seat cushion body 7 with a predetermined interval in the lateral direction. This enables guiding between the horizontal state and the folded state while the paired legs 911c and 912c support the seat cushion body 7.

A guide member 94c is placed outside the paired legs 911c and 912c, and on the right side of the paired legs 911c and 912c, i.e., adjacent to the center of the vehicle. The guide member 94c guides the seat cushion body 7 between the horizontal state and the folded state together with the paired legs 911c and 912c. The guide member 94c is formed by bending both ends of a metal round rod. The upper end of the guide member 94c serves as a rotational shaft 941c supported by the seat-side bearing unit 93 in the horizontal position. The lower end of the guide member 94c serves as a rotational shaft 942c supported by the foot-side bearing units 92c in the horizontal position. The rotational shaft 941c of the guide member 94c adjacent to the seat cushion body 7 is placed further forward than the rotational shafts of the paired legs 911c and 912c adjacent to the seat cushion body 7. In contrast, the rotational shaft 942c of the guide member 94c adjacent to the foot floor surface 110 is placed further forward and downward than the rotational shafts of the paired legs 911c and 912c adjacent to the foot floor surface 110. This geometry enables the seat cushion body 7 to be smoothly folded into a substantially horizontal posture during the folded state.

The first rotation urging unit 95c applies rotational force to at least one leg 912c of the paired legs 911c and 912c when the seat cushion body 7 is guided from the folded state to the horizontal state. The first rotation urging unit 95c is a flat spiral spring placed inside the paired legs 911c and 912c and at a portion of the leg 912c adjacent to the seat cushion body 7. The first rotation urging unit 95c has an inner end fixed to the right seat-side bearing unit 93c and an outer end engaging with the connection frame 913c. In the folded state of the seat cushion body 7, the outer end of the first rotation urging unit 95c engages with the connection frame 913c to apply biasing force to the right leg 912c. The outer end of the first rotation urging unit 95c is detached from the connection frame 913c halfway through guiding of the seat cushion body 7 from the folded state to the horizontal state.

The second rotation urging unit 96c applies rotational force to at least the other leg 911c of the paired legs 911c and 912c when the seat cushion body 7 is guided from the horizontal state to the folded state. The second rotation urging unit 96c is a flat spiral spring placed inside the paired legs 911c and 912c and at a portion of the leg 911c adjacent to the foot floor surface 110. The second rotation urging unit 96c has an inner end fixed to the left foot-side bearing units 92c and an outer end engaging with the bias engagement member 97c. In the horizontal state of the seat cushion body 7, the outer end of the second rotation urging unit 96c engages with the bias engagement member 97c to apply biasing force to the left leg 911c. The outer end of the second rotation urging unit 96c is detached from the bias engagement member 97c halfway through guiding of the seat cushion body 7 from the horizontal state to the folded state.

Figure 23:
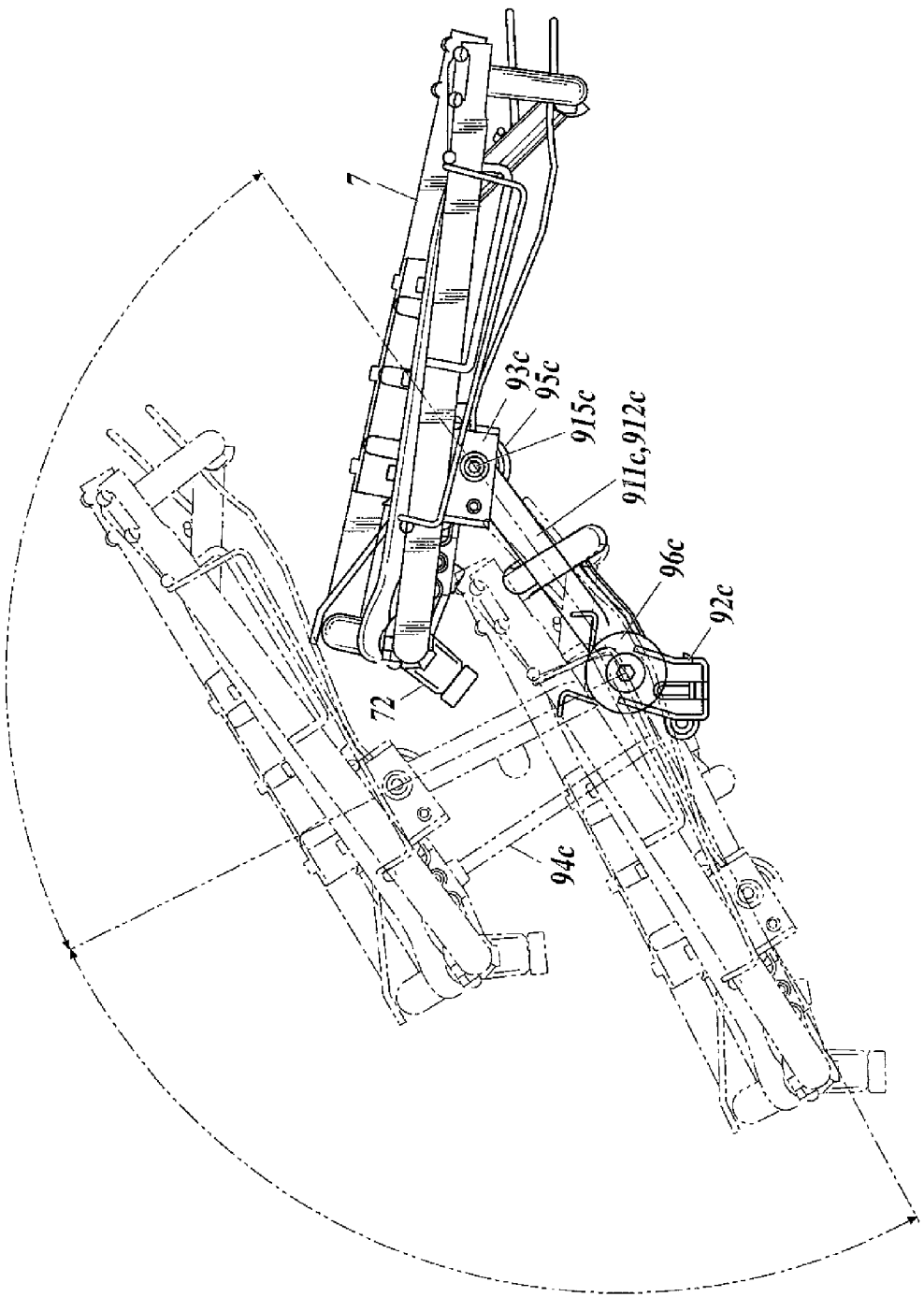
FIG. 23 This is a schematic side view illustrating the operation of the shifting mechanism in FIG. 19.

A detailed operation of the shifting mechanism 9C will be explained. FIG. 23 is a schematic side view illustrating the operation of the shifting mechanism 9C. Solid lines in FIG. 23 indicate the seat cushion body 7 and the shifting mechanism 9C in the horizontal state while two-dot chain lines indicate the seat cushion body 7 and the shifting mechanism 9C during a shifting operation. The seat cushion locking mechanism 8 is unlocked from the horizontal state to release the connection between the first rotation urging unit 95c and the connection frame 913c. As a result, biasing force of the second rotation urging unit 96c rotates the legs 911c and 912c forward and also moves the seat cushion body 7 forward. During this movement, the guide member 94c reduces the rattle of the seat cushion body 7. Additionally, since the connection frame 913c has a curved shape projecting forward in the horizontal state of the seat cushion body 7, the space at the center between the connection frame 913c and the seat cushion body 7 can be secured while the paired legs 911c and 912c guide the seat cushion body 7 from the horizontal state to the folded state. This can prevent contact of the connection frame 913c with the seat cushion body 7 in a folding operation and a smooth folding operation for the seat cushion body 7 can be performed. Since the connection frame 913c projects downward after the folding, the seat cushion body 7 can be placed downward to use a space more effectively.

Since the first rotation urging unit 95c is connected to the connection frame 913c while the second rotation urging unit 96c is detached from the bias engagement member 97c halfway through guiding of the seat cushion body 7 from the horizontal state to the folded state, biasing force of the first rotation urging unit 95c is applied to the paired legs 911c and 912c after the detaching. Since the biasing force counteracts the biasing force of the second rotation urging unit 96c, the seat cushion body 7 moves with a decrease in the rotational force of the paired legs 911c and 912c. As a result, the posture maintenance unit 72 comes into contact with the foot floor surface 110 to then complete the shifting operation and lead to the folded state of the seat cushion body 7. During the folded state, the seat cushion body 7 is maintained in a substantially horizontal posture by the guide member 94c and the posture maintenance unit 72.

In order to prevent the seat cushion body 7 in the folded state from moving upward freely, it is preferable that the biasing force of the first rotation urging unit 95 is at a level that does not raise the seat cushion body 7.

In order to return the seat cushion body 7 in the folded state to the horizontal state, the seat cushion body 7 is raised from the folded state by a user and moved to the horizontal state so as to be locked by the seat cushion locking mechanism 8. The biasing force applied by the first rotation urging unit 95c at this time allows the user to move the seat cushion body 7 with smaller force than the case where there is no biasing force.

Figure 24:
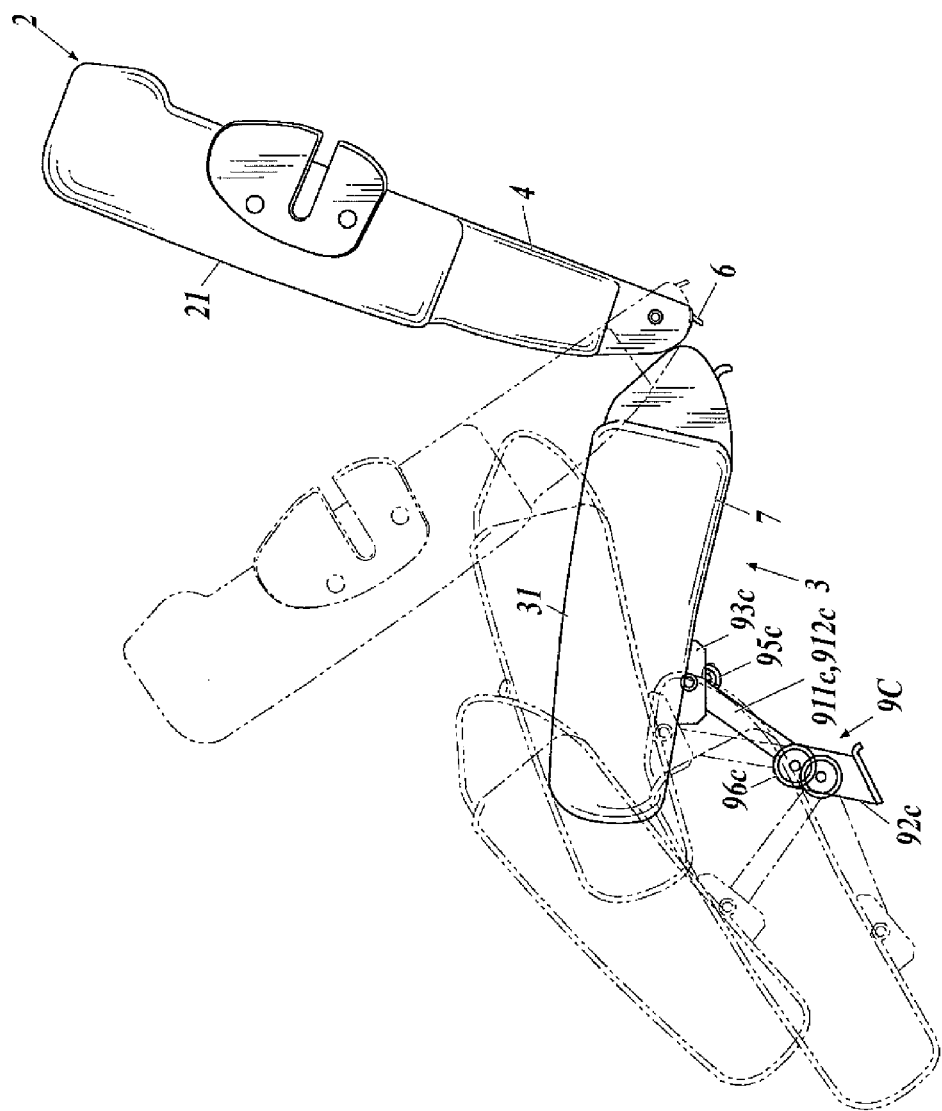
FIG. 24 This is a schematic side view illustrating the operation of the seat back unit and the seat cushion unit including the shifting mechanism in FIG. 19.

The cooperation during the folding operation of the seat back unit 2 and the seat cushion unit 3 will be explained. FIG. 24 is a schematic side view illustrating the operation of the seat back unit 2 and the seat cushion unit 3. Solid lines in FIG. 24 indicate the seat back unit 2 and the seat cushion unit 3 in the seatable state (horizontal state) while two-dot chain lines indicate the seat back unit 2 and the seat cushion unit 3 during the folding operation. If the seat back locking mechanism 5 is unlocked from the seatable state to tilt the seat back body 4, the rocking member 6 unlocks the seat cushion locking mechanism 8 before the complete folding. This applies the biasing force of the first and second rotation urging units 95c and 96c to the paired legs 911c and 912c to rotate the paired legs 911c and 912c, respectively. Thereby, the seat cushion body 7 shifts from the horizontal state to the folded state. If the seat cushion body 7 reaches the folded state, the user folds the seat back body 4 completely to complete the folding operation.

In order to return the seat cushion folded on the foot floor surface to the floor surface, the user has to troublesomely raise the seat cushion in a stooping posture.

That is, it is awaited for a technique to return a seat cushion more easily.

In order to meet such a request, this modification includes the first rotation urging unit 95c applying rotational force to at least one leg 912c when the seat cushion body 7 is guided from the folded state to the horizontal state. As a result, the rotational force of the first rotation urging unit 95c can serve as auxiliary force to raise the seat cushion body 7 with smaller force when the seat cushion body 7 folded on the foot floor surface 110 is returned to the floor surface 100. This configuration allows the seat cushion body 7 to be returned more easily.

The second rotation urging unit 96c applies rotational force to at least the other leg 911c when the seat cushion body 7 is guided from the horizontal state to the folded state. The rotational force can automatically move the seat cushion body 7 to the folded state. This configuration can provide a smooth folding operation of the seat cushion unit 7.

The first rotation urging unit 95c is placed adjacent to the seat cushion body 7 in the leg 912c while the second rotation urging unit 96e is placed adjacent to the foot floor surface 110 in the leg 911c. This configuration can prevent interference between both the units to stabilize the operation.

The first and second rotation urging units 95c and 96c are placed inside the paired legs 911c and 912c and can therefore be protected by the legs 911c and 912c. This configuration can stabilize the operation over a long period of time.

The connection between the first rotation urging unit 95c and at least one leg 912c is released before the seat cushion body 7 reaches the horizontal state. As a result, the seat cushion body 7 starts to move from the horizontal state, while the rotational force of the second rotation urging unit 96c is applied without application of the rotational force of the first rotation urging unit 95c. This configuration can achieve quick start-up of the folding operation.

The connection between the second rotation urging unit 96c and at least the other leg 911c is released before the seat cushion body 7 reaches the folded state. This configuration can intercept the transmission of the biasing force halfway through the folding operation of the seat cushion body 7 to shift the seat cushion body 7 to the folded state by the remaining force. As a result, shock can be eased when the seat cushion body 7 contacts with the foot floor surface 110.

DESCRIPTION OF REFERENCE NUMERALS 1 stowable rear seat
2 seat back unit
3 seat cushion unit
4 seat back body
5 seat back locking mechanism
6 rocking member
7 seat cushion body
8 seat cushion locking mechanism
9 shifting mechanism
21, 31 seat pad
41 seat back frame
42 back board
43, 44 hinge unit
45a, 46a wire
45b, 46b wire
47a reinforcing member
47b reinforcing member
51 lever unit
52 lock unit
71 lock shaft
72 posture maintenance unit
81 base plate
82 regulation pawl
83 ratchet unit
84 hamper
85 detachment stopper
91 frame unit
92 foot-side bearing unit
93 seat-side bearing unit
94 guide member
95 rotation urging unit
96 bias engagement member
100 floor surface
101 support bracket
102 center hinge bracket
110 foot floor surface
115 latched portion
811 plate board
812 screw
813 bottom
814 plate body
815 cutout
816 auxiliary cutout
817 first rotational shaft 818 second rotational shaft
819 stopper
821 concave portion
822 biasing spring
823 cam surface
824 first cam surface
825 second cam surface
831 one end
832 cam surface
833 upper portion
834 lower portion
835 other end
836 first urging surface
837 second urging surface
841 one side
842 one end
843 other end
911, 912 leg
913 connection frame
914 rotational shaft unit
915 pivot hole
941 rotational shaft
942 rotational shaft

The invention claimed is:

1. A stowable rear seat, comprising:
a seat back unit; and
a seat cushion unit, wherein
the seat back unit comprising:
  a tiltable seat back body erecting on a floor surface;
  a seat back locking mechanism for locking a tilt of the seat back body; and
  a rocking member provided at a lower end of the seat back body which rocks in an anteroposterior direction in cooperation with a tilting operation of the seat back body after locking of the seat back locking mechanism is unlocked;
the seat cushion unit comprising:
  a seat cushion body horizontally placed on the floor surface in front of the seat back body, the seat cushion body being foldable on a foot floor surface at a lower position than the floor surface; and
  a seat cushion locking mechanism provided in the floor surface, the seat cushion locking mechanism engaging with a back end of the seat cushion body to lock a horizontal state of the seat cushion body on the floor surface, and
the rocking member is detached from the seat cushion locking mechanism when the seat back body is in an upright state, and is in contact with the seat cushion locking mechanism when the seat back body is in a tilted state to release the lock of the seat cushion locking mechanism.

2. The stowable rear seat according to claim 1, wherein
the seat cushion unit comprises:
  a shifting mechanism which shifts the seat cushion body between the horizontal state on the floor surface and a folded state on the foot floor surface, and
the shifting mechanism shifts the seat cushion body from the horizontal state on the floor surface to the folded state on the foot floor surface when the seat cushion locking mechanism is unlocked.

3. The stowable rear seat according to claim 1, further comprising:
a lock shaft provided at the back end of the seat cushion body, the lock shaft engaging with the seat cushion locking mechanism to lock the horizontal state of the seat cushion body on the floor surface, wherein
the seat cushion locking mechanism comprises:
  a base plate having a cutout which is extended vertically and an upper part thereof opened such that the lock shaft is capable of moving forward and backward;
  a regulation pawl rotatably attached to the base plate, the regulation pawl being rotated urged by the lock shaft entering the cutout, occluding an upside of the lock shaft after entry of the lock shaft up to a lower end of the cutout to regulate upward movement of the lock shaft and maintaining the horizontal state of the seat cushion body; and
  a ratchet unit rotatably attached to the base plate and engaging with the regulation pawl to thereby lock/release the regulated state of the regulation pawl, wherein
the ratchet unit has one end engaging with the regulation pawl and an other end placed on a rocking path of the rocking member, the other end rotating the ratchet unit urged by the rocking member and releasing the regulated state of the regulation pawl;
the one end of the ratchet unit engages with the regulation pawl;
the ratchet unit is urged in a locking direction of the regulation pawl; and
the other end of the ratchet unit is configured to rotate the ratchet unit in a direction opposite to the urging direction so as to retract the ratchet unit from the rocking path when the rocking member urges one of a first urging surface placed on the rocking path of the rocking member and urged by the rocking member when the seat back body is tilted from the upright state and a second urging surface urged by the rocking member when the seat back body erects from the tilted state.

4. The stowable rear seat according to claim 3, wherein
the one end of the ratchet unit engages with the regulation pawl by coming into contact with respective cam surfaces provided therein; and
at least one of the cam surfaces of the one end of the ratchet unit and the regulation pawl has such a shape that the ratchet unit pushes the regulation pawl toward the cutout when the regulated state of the regulation pawl is to be locked.

5. The stowable rear seat according to claim 4, wherein
a distance from the cam surface of the one end of the ratchet unit to a rotational shaft of the ratchet unit is shorter than a distance from a position of the rocking member contacting the first urging surface to the rotational shaft of the ratchet unit.

6. The stowable rear seat according to claim 3, wherein
the first urging surface is closer to a rotational shaft of the ratchet unit than the second urging surface;
the other end of the ratchet unit has the first urging surface projecting outward from the base plate; and
the rocking member rocks outside the base plate.

7. The stowable rear seat according to claim 3, wherein
the second urging surface is provided on the tip surface of the other end of the ratchet unit; and
the other end of the ratchet unit has a larger width at a position that is further distant from a rotational shaft of the ratchet unit.

8. The stowable rear seat according to claim 1, further comprising:
a shifting mechanism for shifting the seat cushion body between the horizontal state on the floor surface and a folded state on the foot floor surface, wherein the shifting mechanism comprises:
- a pair of parallel legs rotatably attached to the seat cushion body and the foot floor surface and supporting the seat cushion body so as to guide the seat cushion body between a horizontal state on the floor surface and a folded state on the foot floor surface; and
- a guide member rotatably attached to the seat cushion body and the foot floor surface and comprising a rod member for guiding the seat cushion body between the horizontal state on the floor surface and the folded state on the foot floor surface together with the paired legs.

9. The stowable rear seat according to claim 8, wherein both ends of the rod member comprise rotational shafts.

10. The stowable rear seat according to claim 8, wherein
- a rotational shaft of the guide member adjacent to the seat cushion body is placed further forward than rotational shafts of the paired legs adjacent to the seat cushion body; and
- a rotational shaft of the guide member adjacent to the foot floor surface is placed further forward and downward than rotational shafts of the paired legs adjacent to the foot floor surface.

11. The stowable rear seat according to claim 8, wherein the guide member is placed outside the paired legs.

12. The stowable rear seat according to claim 1, further comprising:
- a shifting mechanism for shifting the seat cushion body between the horizontal state on the floor surface and a folded state on the foot floor surface, wherein
the shifting mechanism comprises:
- a pair of right and left legs rotatably attached to the seat cushion body and the foot floor surface and rotating relative to the foot floor surface in the anteroposterior direction to support the seat cushion body so as to guide the seat cushion body between the horizontal state on the floor surface and the folded state on the foot floor surface; and
- a rotation urging unit for applying rotational force to at least one of the paired legs when the seat cushion body is guided from the horizontal state on the floor surface to a folded state on the foot floor surface.

13. The stowable rear seat according to claim 12, wherein connection between the rotation urging unit and at least one of the legs is released before the seat cushion body reaches the folded state on the foot floor surface.

14. The stowable rear seat according to claim 12, wherein the rotation urging unit is placed inside the paired legs.

15. The stowable rear seat according to claim 12, wherein the rotation urging unit is placed adjacent to the foot floor surface in the leg.

16. The stowable rear seat according to claim 1, further comprising:
- a shifting mechanism for shifting the seat cushion body between the horizontal state on the floor surface and a folded state on the foot floor surface, wherein
the shifting mechanism comprises:
- a pair of right and left legs rotatably attached to the seat cushion body and the foot floor surface and rotating relative to the foot floor surface in the anteroposterior direction to support the seat cushion body so as to guide the seat cushion body between the horizontal state on the floor surface and the folded state on the foot floor surface; and
- a first rotation urging unit for applying rotational force to at least one of the paired legs when the seat cushion body is guided from the folded state on the foot floor surface to the horizontal state on the floor surface.

17. The stowable rear seat according to claim 16, further comprising:
- a second rotation urging unit for applying rotational force to at least the other of the paired legs when the seat cushion body is guided from the horizontal state on the floor surface to the folded state on the foot floor surface.

18. The stowable rear seat according to claim 17, wherein
the first rotation urging unit is placed adjacent to the seat cushion body in the leg; and
the second rotation urging unit is placed adjacent to the foot floor surface in the leg.

19. The stowable rear seat according to claim 17, wherein the first and second rotation urging units are placed inside the paired legs.

20. The stowable rear seat according to claim 17, wherein
connection between the first rotation urging unit and at least one of the legs is released before the seat cushion body reaches the horizontal state on the floor surface; and
connection between the second rotation urging unit and at least the other of the legs is released before the seat cushion body reaches the folded state on the foot floor surface.

* * * * *